(12) United States Patent
Bettouyashiki et al.

(10) Patent No.: US 8,292,504 B2
(45) Date of Patent: *Oct. 23, 2012

(54) CASSETTE ACCOMMODATING DEVICE, AND RADIATION DETECTION SYSTEM

(75) Inventors: Akihito Bettouyashiki, Kanagawa (JP); Yoshiki Takeoka, Kanagawa (JP); Yutaka Yoshida, Kanagawa (JP); Keiji Tsubota, Kanagawa (JP); Shoji Takahashi, Kanagawa (JP); Yasunori Ohta, Kanagawa (JP); Naoyuki Nishino, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 209 days.

This patent is subject to a terminal disclaimer.

(21) Appl. No.: 12/844,845

(22) Filed: Jul. 28, 2010

(65) Prior Publication Data

US 2011/0013751 A1 Jan. 20, 2011

Related U.S. Application Data

(63) Continuation-in-part of application No. 12/405,257, filed on Mar. 17, 2009, now Pat. No. 7,785,005.

(30) Foreign Application Priority Data

Mar. 18, 2008 (JP) ................................ 2008-070327
Mar. 10, 2009 (JP) ................................ 2009-056239

(51) Int. Cl.
*H01J 31/49* (2006.01)

(52) U.S. Cl. .......................... 378/189; 378/204; 320/107
(58) Field of Classification Search .................. 378/167, 378/169, 170, 172, 189, 204; 320/107–115
See application file for complete search history.

(56) References Cited

U.S. PATENT DOCUMENTS 7,785,005 B2 * 8/2010 Bettouyashiki et al. ...... 378/189

FOREIGN PATENT DOCUMENTS

JP 3611084 B 7/2000
JP 2002-248095 A 9/2002

* cited by examiner

*Primary Examiner* — Courtney Thomas
(74) *Attorney, Agent, or Firm* — SOLARIS Intellectual Property Group, PLLC

(57) ABSTRACT

A cassette accommodating device accommodates casings of a plurality of sizes. Each casing is detachably inserted with a cassette installed with a rechargeable battery and a radiation detection unit that is supplied with power from the rechargeable battery and generates a radiographic image according to an amount of received radiation. Each casing is provided on at least one of two connected side faces with a power receiving unit that receives power for charging the rechargeable battery. The device comprises a groove portion, formed with a sloping face that faces one of the two side faces of an accommodated casing, and a bottom face that faces the other of the two side faces of the accommodated casing. The bottom face is inclined such that the casing moves toward the sloping face when the casing is accommodated. A power supply unit is formed to the sloping face and/or the bottom face so as to supply power to the power receiving unit when the casing has been accommodated.

18 Claims, 17 Drawing Sheets

CASSETTE ACCOMMODATING DEVICE, AND RADIATION DETECTION SYSTEM

CROSS-REFERENCE TO RELATED APPLICATION

This application is a continuation-in-part application of U.S. patent application Ser. No. 12/405,257 filed Mar. 17, 2009, the disclosure of which is incorporated by reference herein. This application claims priority under 35 USC 119 from Japanese Patent Application Nos. 2008-070327 and 2009-056239, the disclosure of which are incorporated by reference herein.

BACKGROUND OF THE INVENTION

1. Field of the Invention

The present invention relates to a cassette accommodating device, and a radiation detection system, and in particular to a cassette accommodating device, and radiation detection system capable of accommodating a cassette.

2. Description of the Related Art

Cassette accommodating boxes (cassette stands) are known (see Japanese Patent Application Laid-Open (JP-A) Nos. 2002-248095 and published Japanese Patent No. 3611084). These cassette accommodating boxes are capable of accommodating plural individual digital cassettes (or radiation detection cassettes) that each have a radiation detector and an image memory and are configured to store radiographic images detected by the radiation detector, as image data in a memory. The cassette accommodating boxes are electrically connected with the digital cassettes.

With the above technology, however, the cassette accommodating device is not stably electrically connected to the cassettes when plural individual cassettes with different size are accommodated, since there is no positional alignment of the cassettes with the cassette accommodating device.

SUMMARY OF THE INVENTION

The present invention has been made in view of the above circumstances and provides a cassette accommodating device, and a radiation detection system.

A first aspect of the present invention provides a cassette accommodating device that is configured to accommodate casings of a plurality of sizes. Each casing is detachably inserted with a cassette installed with a rechargeable battery and a radiation detection unit that is supplied with power from the rechargeable battery and generates a radiographic image according to an amount of received radiation. Each casing is provided on at least one of two connected side faces with a power receiving unit that receives power for charging the rechargeable battery. The device comprises a groove portion, formed with a sloping face that faces one of the two side faces of an accommodated casing, and a bottom face that faces the other of the two side faces of the accommodated casing. The bottom face is inclined such that the casing moves toward the sloping face when the casing is accommodated. A power supply unit is formed to the sloping face and/or the bottom face so as to supply power to the power receiving unit when the casing has been accommodated.

A second aspect of the present invention provides a cassette accommodating device that is configured to accommodate casings of a plurality of sizes. Each casing is detachably inserted with a cassette installed with a first rechargeable battery and a radiation detection unit that is supplied with power from the first rechargeable battery and generates a radiographic image according to an amount of received radiation. Each casing is provided with a second rechargeable battery for supplying power to charge the first rechargeable battery. Each casing is provided on at least one of two connected side faces with a power receiving unit that receives power for charging the second rechargeable battery. The device comprises a groove portion, formed with a sloping face that faces one of the two side faces of an accommodated casing, and a bottom face that faces the other of the two side faces of the accommodated casing. The bottom face is inclined such that the casing moves toward the sloping face when the casing is accommodated. A power supply unit is formed to the sloping face and/or the bottom face so as to supply power to the power receiving unit when the casing has been accommodated.

BRIEF DESCRIPTION OF THE DRAWINGS

Exemplary embodiments of the present invention will be described in detail based on the following figures, wherein.

DETAILED DESCRIPTION OF THE INVENTION

Explanation will now be given of details of exemplary embodiments of the present invention, with reference to the drawings.

Figure 1:
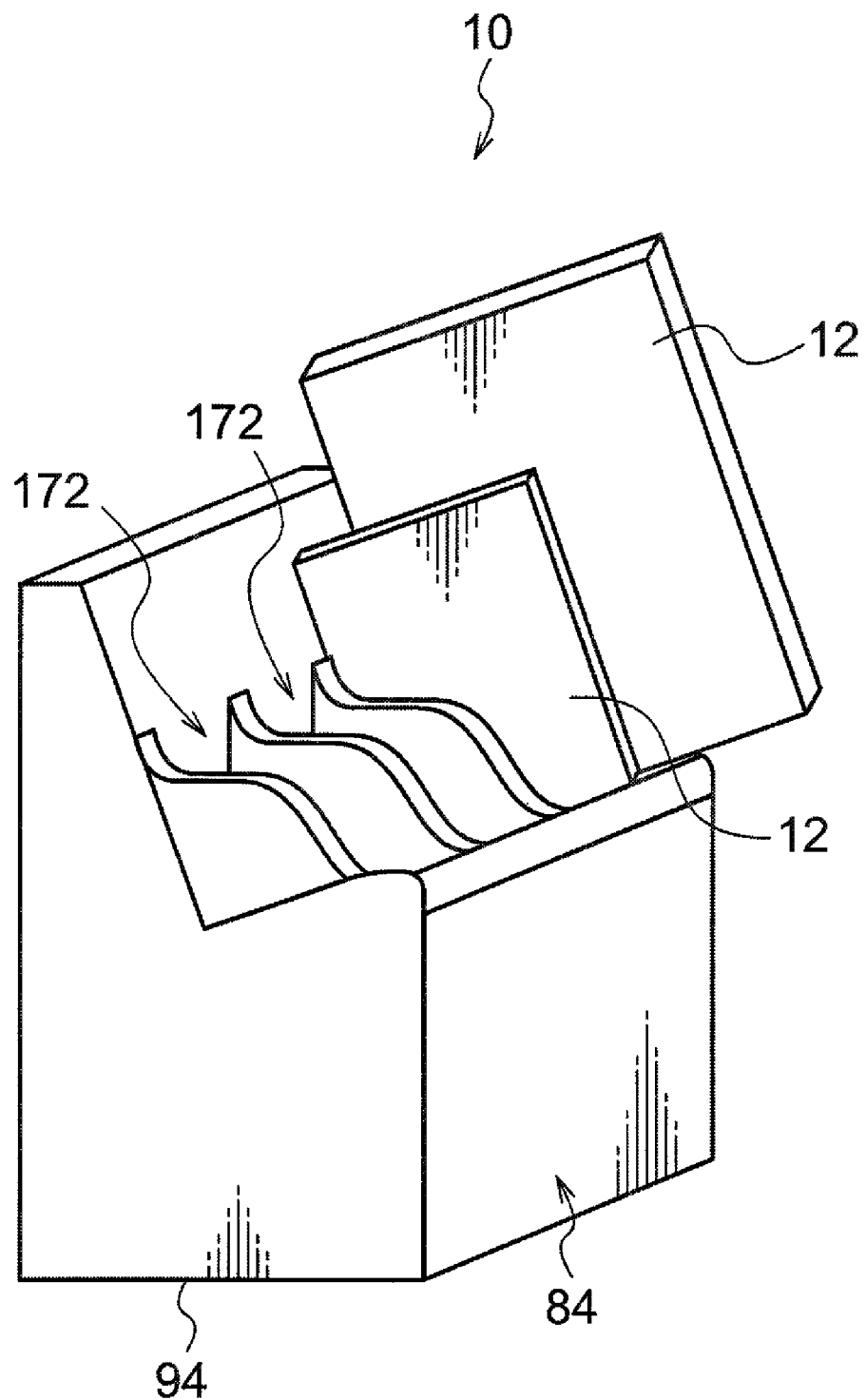
FIG. 1 is a perspective view showing a schematic configuration of a radiographic image handling system according to a first exemplary embodiment of the present invention.

A radiographic image handling system 10 according to a first exemplary embodiment is configured, as shown in FIG. 1, to include: a portable digital cassette 12, capable of converting into image data image information acquired each time image-information-carrying radiation is irradiated thereon, and capable of accumulating and storing the image data; and a cassette stand 84, capable of accommodating the digital cassette 12, recharging the accommodated digital cassette 12, and reading out the image data that has been accumulated and stored in the accommodated digital cassette 12. It should be noted that the radiographic image handling system 10 corresponds to the radiation detection system according to the present invention, the digital cassette 12 corresponds to the cassette according to the present invention, and the cassette stand 84 corresponds to the cassette accommodating device according to the present invention.

Figure 2A:
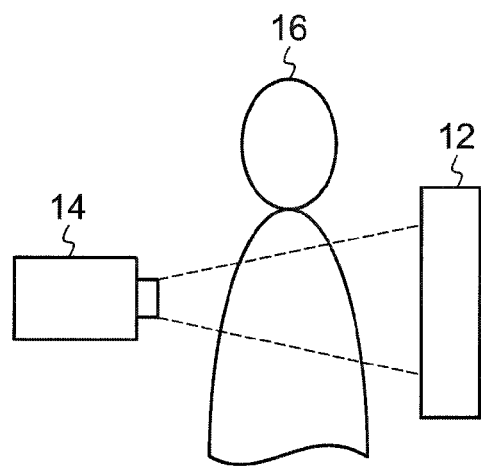
FIG. 2A is a schematic diagram showing the disposition of a digital cassette during radiographic image capture.

When capturing radiographic images, the digital cassette 12 is disposed with a separation to a radiation generator 14 that generates radiation, such as X-rays, as shown in FIG. 2A. An imaging position for positioning an imaging subject 16 is present between the radiation generator 14 and the digital cassette 12. When capture of a radiographic image is instructed the radiation generator 14 emits radiation of a radiation amount, in accordance with preset imaging conditions or the like. The radiation radiated from the radiation generator 14 picks up image information by transmission through the imaging subject 16 positioned at the imaging position, and this radiation is then irradiated onto the digital cassette 12.

Figure 2B:
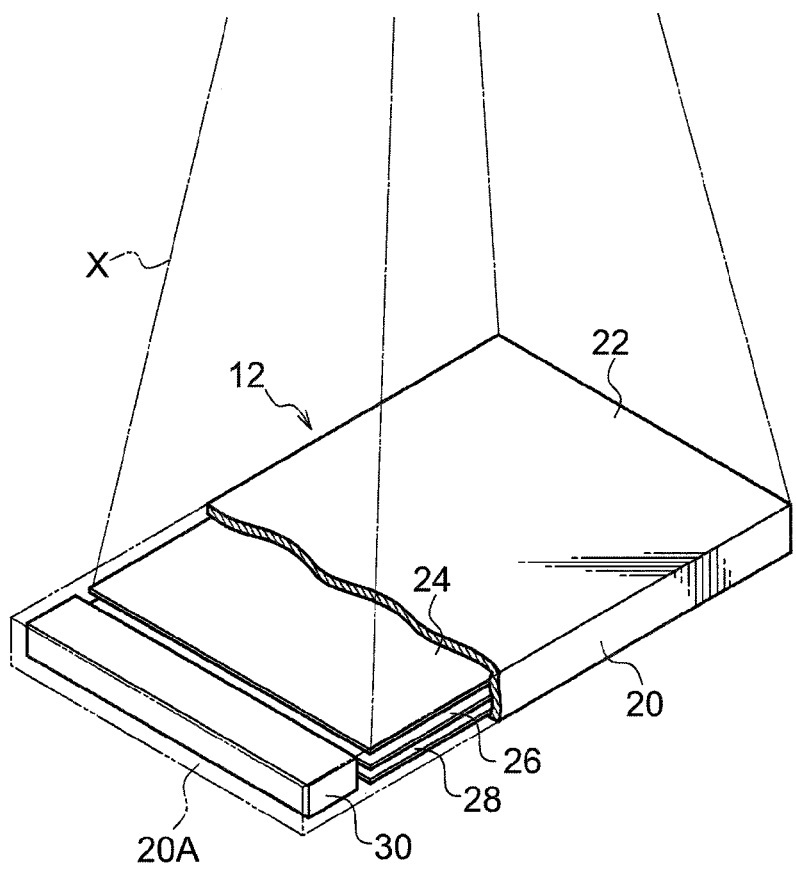
FIG. 2B is a perspective view showing the internal structure of a digital cassette.

The digital cassette 12 is covered by a flat plate-shaped casing (case) 20 formed of a thickness of material such that X-rays can be transmitted therethrough, as shown in FIG. 2B. Within the casing 20 are disposed, in sequence from an irradiation face 22 of the casing 20 onto which the X-rays are irradiated, a grid 24 for removing any scattered X-rays generated due to transmission through the imaging subject 16, a radiation detector (radiation detection panel) 26 for detecting X-rays, and a lead plate 28 for absorbing back-scattering X-rays. It should be noted that the irradiation face 22 of the casing 20 may be configured by the grid 24. In addition a case 30 for housing a microcomputer containing various circuits (described later) is disposed at one end within the casing 20. It is also preferable to dispose a lead plate or the like at the irradiation face 22 side of the case 30 in order to avoid the various circuits within the case 30 being damaged during irradiation with X-rays.

Figure 3:
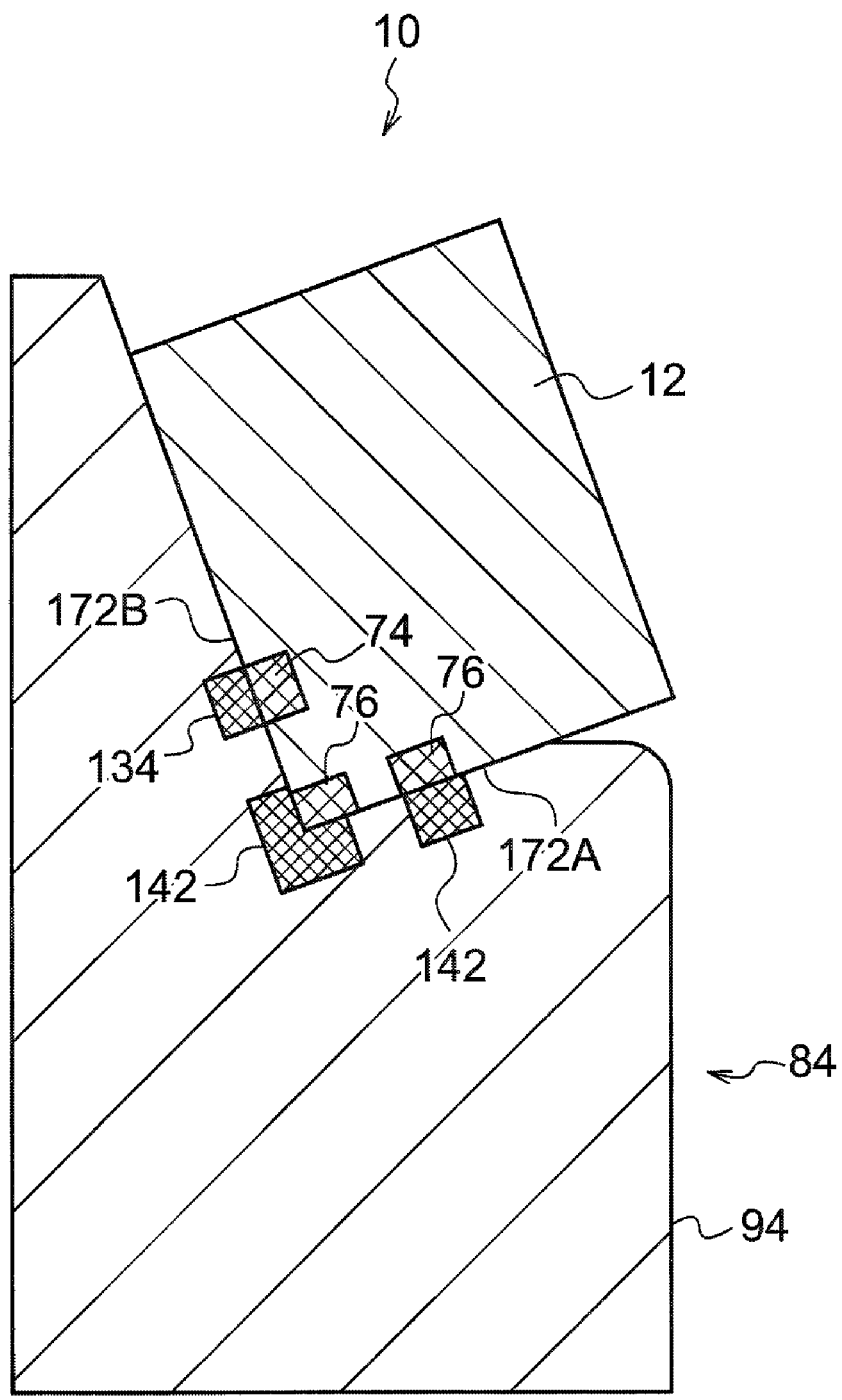
FIG. 3 is a cross-sectional view showing a schematic configuration of a digital cassette and a cassette stand according to the first exemplary embodiment of the present invention.

As shown in FIG. 1 and FIG. 3, plural insertion grooves 172, recessed inclined slots, are formed in the top face of a casing 94 of the cassette stand 84. The insertion grooves 172 are formed with openings of a rectangular shape, and the opening width is a width into which it is possible to insert the casing 20 of the digital cassette 12 (for example an ample width for the thickest digital cassette 12). Configuration is made in this manner such that plural individual digital cassettes 12 with different size can be accommodated in the plural insertion grooves 172 at the same time. The casing 20 of the digital cassette 12 is inserted into the insertion groove 172 of the image reading device 84 whilst in a state in which the edge line, formed between the end face of the casing 20 at the case 30 disposed side (in the present exemplary embodiment this side face is referred to as "bottom face 20A") and a side face connected to the bottom face 20A, faces downwards. When thus inserted the bottom face 20A of the casing 20 of the digital cassette 12 faces a bottom face 172A of the insertion groove 172, and the side face connected to the bottom face 20A faces a back face 172B of the insertion groove 172, serving as a sloping face. When the bottom face 20A of the casing 20 of the digital cassette 12 is inserted so as to contact the bottom face 172A of the insertion groove 172 (see FIG. 3), the adjacent face to the bottom face 20A of the casing 20 of the digital cassette 12 contacts the back face 172B of the insertion groove 172, due to the bottom face 20A being inclined so as to move the digital cassette 12 toward the back face 172B of the insertion groove 172. As this occurs the edge line formed between the bottom face 20A of the casing 20 and the side face connected to the bottom face 20A, contacts the edge line formed between the bottom face 172A and the back face 172B of the insertion groove 172, and the digital cassette 12 is positionally aligned to the cassette stand 84.

Figure 4:
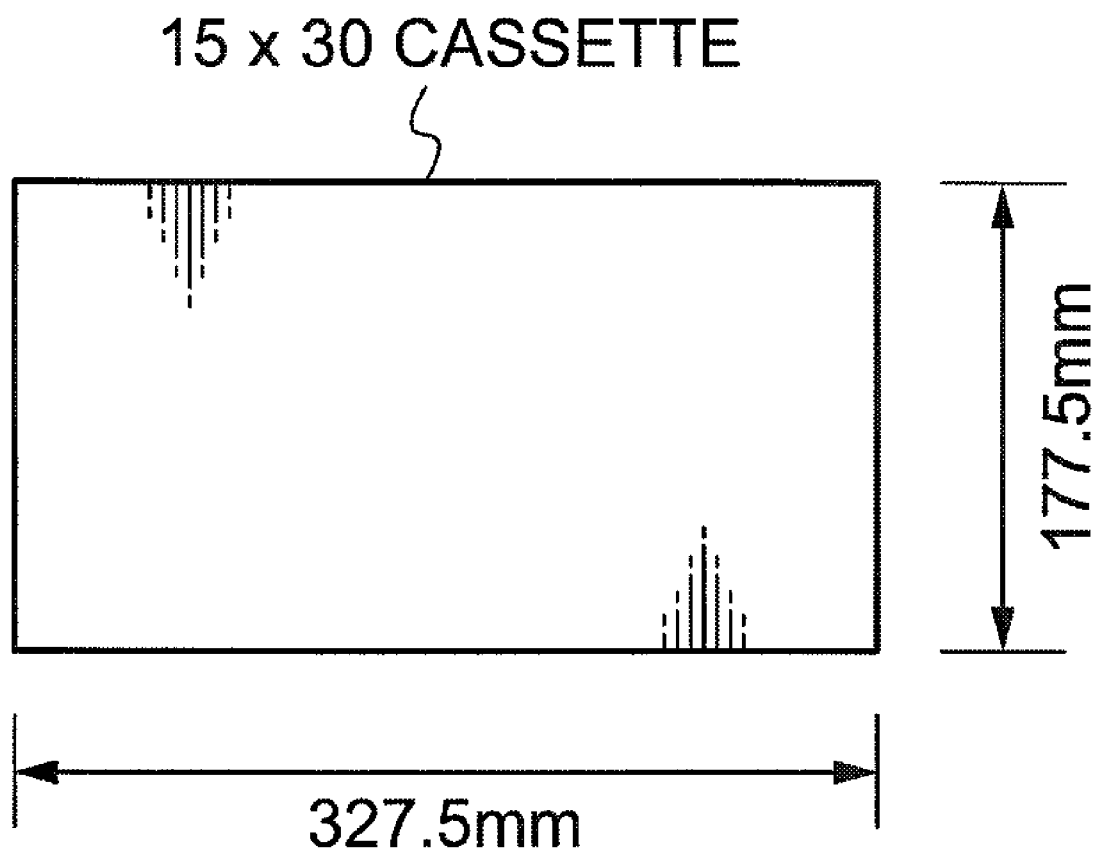
FIG. 4 is a diagram for explaining the size of a minimum sized cassette.

Rechargeable battery electrodes 76 are provided so as to be exposed from a corner region that includes the edge line formed between the bottom face 20A of the casing 20 of the digital cassette 12 and the side face connected to the bottom face 20A, and from a predetermined region of the bottom face 20A within a predetermined range from the edge line of the bottom face 20A. This predetermined range is a length range in the length direction within the region of contact of the bottom face 20A of the casing 20 of the smallest sized digital cassette 12 against the bottom face 172A facing the bottom face 20A. For example, if the length in the length direction of the bottom face 20A of the casing 20 of the smallest digital cassette 12 is the same length as the length direction of the bottom face 172A or shorter, then the range is the length along the bottom face of a 15×30 cassette (177.5 mm) as defined in JIS specification JISZ4905, as shown in FIG. 4. Accordingly, the rechargeable battery electrodes 76 are provided within the region of contact between the bottom face 172A of the insertion groove 172 of the cassette stand 84 and the bottom face 20A for all sizes of digital cassette 12.

An output electrode 74 is also provided so as to be exposed within a predetermined region of the side face connected to the bottom face 20A, within a predetermined range from the edge line formed between the bottom face 20A of the casing 20 of the digital cassette 12 and the side face connected to the bottom face 20A. This predetermined range is a length range in the length direction of the region of contact of the side face connected to the bottom face 20A of the casing 20 of the smallest digital cassette 12 against the opposing back face 172B. For example, if the length in the length direction of the side face connected to the bottom face 20A of the casing 20 of the smallest digital cassette 12 is the same length as the length direction of the bottom face 172B or shorter, then the range is the length along the side face connected to the bottom face of a 15×30 cassette (327.5 mm) as defined in JIS specification JISZ4905. Accordingly, the output electrode 74 is provided within the region of contact between the back face 172B of the insertion groove 172 of the cassette stand 84 and the side face of all sizes of digital cassette 12.

In the present exemplary embodiment the rechargeable battery electrodes 76 are provided for all sizes of digital cassette 12 in the corner region and in the predetermined region from the edge line of the bottom face 20A, and the output electrode 74 is provided for all sizes of digital cassette 12 in the predetermined region from the edge line of the side face connected to the bottom face 20A.

Electrodes 134, 142 are provided so as to be exposed respectively from the back face 172B and the bottom face 172A of each of the insertion grooves 172 of the casing 94 of the cassette stand 84, so as to make contact respectively with the output electrode 74 and the rechargeable battery electrodes 76 when the casing 20 of the digital cassette 12 is in the inserted state in the insertion groove 172. Namely, in each of the insertion grooves 172 the electrodes 142 are provided so as to be exposed at the corner region that includes the edge line formed between the bottom face 172A and the back face 172B, and at the predetermined region relative to the edge line of the bottom face 172A (regions corresponding to the same regions as the regions of the digital cassette 12 provided with the rechargeable battery electrodes 76). In each of the insertion grooves 172 the electrode 134 is provided so as to be exposed at the predetermined region relative to the edge line of the back face 172B (a region corresponding to the same region as the region of the digital cassette 12 provided with the output electrode 74).

The bottom face 20A of the casing 20 of the digital cassette 12 contacts the bottom face 172A of the insertion groove 172 and the side face adjacent to the bottom face 20A of the casing 20 of the digital cassette 12 is in a state of contact with the back face 172B of the insertion groove 172. In this state, due to provision of the output electrode 74, the rechargeable battery electrodes 76, and the electrodes 134, 142 in this manner, each of the individual rechargeable battery electrodes 76 contacts the respective individual electrodes 142, with the individual rechargeable battery electrodes 76 enter a conductive state with the individual electrodes 142. In addition the output electrode 74 also contacts the electrode 134, with the output electrode 74 entering a conductive state with the electrode 134.

The electrodes 134, 142 provided to the bottom face 172A and the back face 172B of the insertion grooves 172 of the cassette stand 84 are preferably provided with rectangular protrusions. In such cases, configuration may be made such that the output electrode 74 and the rechargeable battery electrodes 76, provided to the side face and to the bottom face 20A of the casing 20 of the digital cassette 12, are provided within recesses with rectangular shaped openings. Thereby, the rechargeable battery electrodes 76 contact the electrodes 142, and the output electrode 74 contacts the electrode 134, in a state in which the protrusions on the cassette stand 84 side intrude into the recesses on the digital cassette side.

Figure 5:
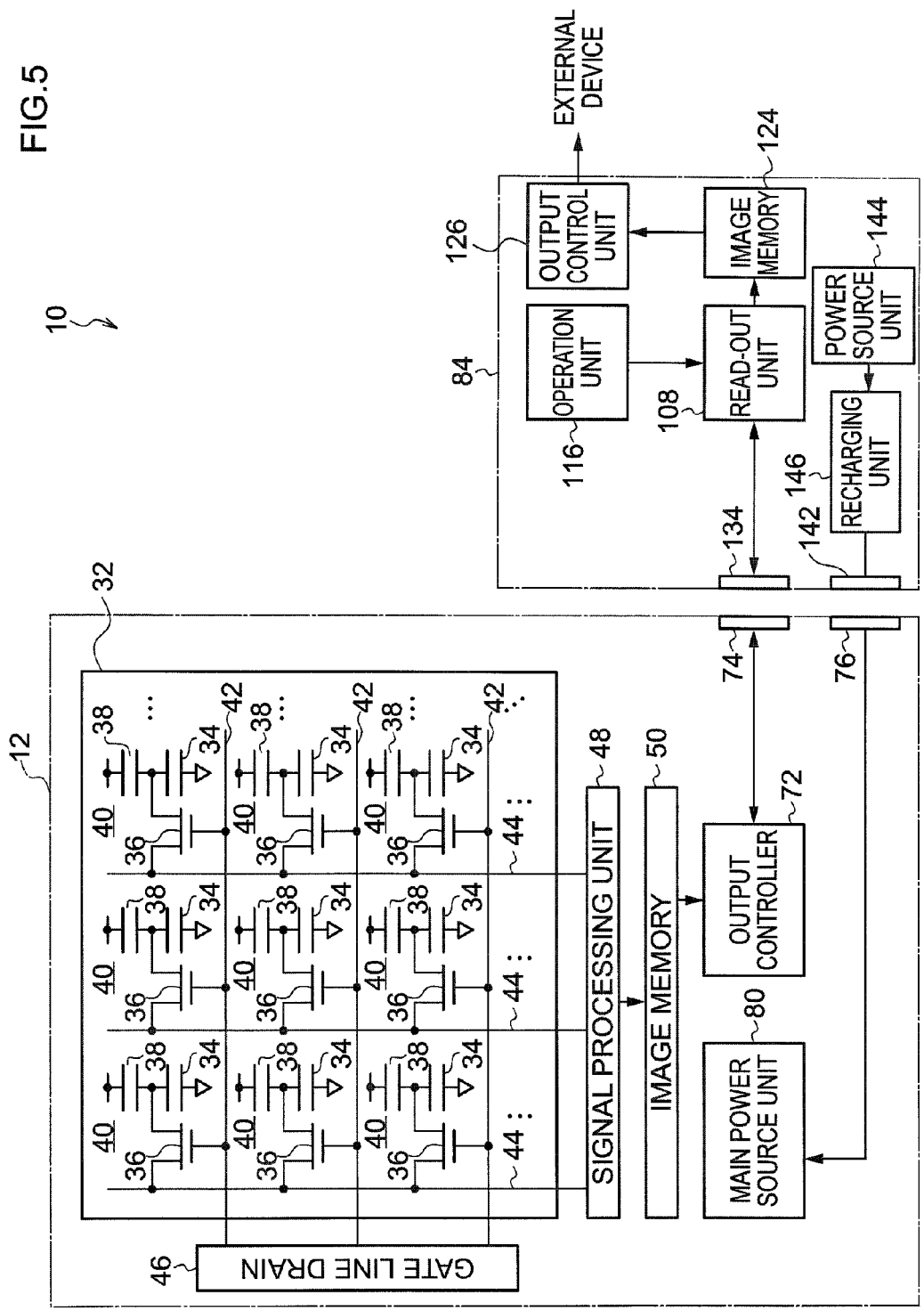
FIG. 5 is a block diagram showing a schematic configuration of a digital cassette and a cassette stand according to the first exemplary embodiment of the present invention.

Explanation will now be given of the configuration of an electrical system of the digital cassette 12 and the cassette stand 84. The radiation detector 26 of the digital cassette 12 is configured with a TFT active matrix board 32, as shown in FIG. 5, layered thereon with a photoelectric conversion layer for absorbing radiation and converting it into charge. The photoelectric conversion layer is formed with, for example, selenium as a main component thereof (for example contained at a proportion of 50% or above) using non-crystalline a-Se (amorphous selenium). When radiation is irradiated onto the photoelectric conversion layer, the photoelectric conversion layer converts irradiated radiation into charge by generating a charge (electron-hole pair) within the layer of an amount of electric charge in accordance with the amount of irradiated radiation. Plural individual pixel portions 40 are disposed in a matrix shape on the TFT active matrix board 32. Each of the pixel portions 40 is provided with an individual storage capacitor 34 for accumulating charge generated in the photoelectric conversion layer, and a TFT 36 for reading out the charge accumulated in the storage capacitor 34 (in FIG. 5 the photoelectric conversion layer corresponding to each of the individual pixel portions 40 is shown pictorially as photoelectric conversion portions 38). The charge generated in the photoelectric conversion layer, by irradiation of the digital cassette 12 with radiation, is accumulated in the respective storage capacitor 34 of the individual pixel portions 40. In this manner, the image-information-carrying radiation that is irradiated onto the digital cassette 12 is converted into charge information, and accommodated in the radiation detector 26.

The TFT active matrix board 32 is provided with plural gate lines 42 extending along a fixed direction (row direction) for switching on and off the TFT 36 of the individual pixel portions 40, and is provided with plural data lines 44 extending in a direction perpendicular to the gate lines 42 (column direction) for reading out accumulated charge from the storage capacitors 34 through the TFTs 36 that are switched on. Individual gate lines 42 are connected to a gate line drain 46, and individual data lines 44 are connected to a signal processing unit 48. When charge has been accumulated in the storage capacitor 34 of individual pixel portions 40, the TFTs 36 of the individual pixels 40 are switched on in sequence of single row units by a signal supplied from the gate line drain 46 through the gate lines 42, and the charge that has been accumulated in the storage capacitor 34 of the pixel portions 40 for which the TFT 36 is on, is transmitted as a charge signal through the data lines 44 and input to the signal processing unit 48. The charge that has been accumulated in the storage capacitors 34 of individual pixel portions 40 is consequently read out in sequence in single row units.

While not illustrated in the figures, the signal processing unit 48 is provided with an amplifier and a sample and hold circuit for each of the individual data lines 44. After the charge signal transmitted through the data line 44 has been amplified by the amplifier it is then held in the sample and hold circuit. An A/D converter is connected in sequence to the output side of the sample and hold circuits, and the charge signals held in the individual sample and hold circuits are input in sequence (serially) into a multiplexer, and converted into digital image data by the A/D converter. There is an image memory 50 connected to the signal processing unit 48, and image data output from the A/D converter of the signal processing unit 48 is stored in sequence in the image memory 50. The image memory 50 has a capacity capable of storing image data equivalent to plural films, and each time radiographic imaging is performed the image data obtained by imaging is stored in sequence in the image memory 50.

The output electrode 74 of the digital cassette 12 is connected to an output controller 72 through a conductor. The output controller 72 is realized by a microcomputer, and outputs image data stored in the image memory 50 according to data output requests from the cassette stand 84, outputting this image data to the cassette stand 84 through the output electrode 74.

A main power source unit 80 is provided to the digital cassette 12, and the main power source unit 80 supplies power to the various circuits and various elements (microcomputer(s)) with the functionality of the gate line drain 46, the signal processing unit 48, the image memory 50, and the output controller 72 etc.), and the various circuits and various elements are operated by power supplied from the main power source unit 80. The TFT active matrix board 32 is supplied with power from the main power source unit 80, and generates charge of a charge amount according to the amount of radiation irradiated. Configuration of the main power source unit 80 is preferably by an internal battery (a rechargeable battery) so that the portability of the digital cassette 12 is not compromised, with supply of power to the various circuits and elements from a charged battery.

The rechargeable battery electrode 76 of the digital cassette 12 is connected to the main power source unit 80 through a conductor. The rechargeable power source of the main power source unit 80 is recharged by power supplied from the cassette stand 84 through the rechargeable battery electrode 76.

An operation unit 116 is connected to the read-out unit 108. The operation unit 116 is configured to include: a display (not shown in the figures), provided to an operation panel (not shown in the figures) of the casing 94 and capable of displaying given information including various messages; and a keyboard (not shown in the figures) of plural keys, also provided on the casing 94. Various instructions and information are input to the read-out unit 108 by a user operating the keyboard.

An image memory 124 is connected to the read-out unit 108 and the electrode 134 of the cassette stand 84 is also connected to the read-out unit 108 through a conductor. In communication between the digital cassette 12 and the cassette stand 84, when the electrode 134 contacts and is in a conductive state with the power output electrode 74, image data accumulated and stored in the image memory 50 of the digital cassette 12 is transferred to the read-out unit 108 of the cassette stand 84, and the image data is stored in the image memory 124 by the read-out unit 108.

An output control unit 126 is connected to the image memory 124. When the operation unit 116 instructs image data stored in the image memory 124 to be output to an external device, the output control unit 126 reads out the image data from the image memory 124 and controls the output of the image data to the external device. Examples of external devices include a display for displaying as image represented by the image data (radiographic images), a printing device for printing an image represented by the image data on a sheet printing medium, information recording devices for recording image data on a CD-R or other known recording medium, communication devices for transmitting image data to an information processing device connected through a communications network, etc.

A power source unit 144 is provided to the image reading device 84. The power source unit 144 is continuously connected to a commercial power supply, and rectifies and transforms the voltage of the power supplied from the commercial power source before supplying power to the various circuits and elements within the cassette stand 84 (read-out unit 108, the operation unit 116, the image memory 124, the output control unit 126 etc.). The various circuits and various elements of the image reading device 84 are operated by power supplied from the power source unit 144.

The power source unit 144 is connected to a recharging unit 146, and the electrode 142 of the cassette stand 84 is connected to the recharging unit 146 through a conductor. When the electrode 142 is in contacts and is in a conductive state with the rechargeable battery electrode 76 the recharging unit 146 supplies power that has been supplied from the power source unit 144 to the rechargeable battery of the main power source unit 80 of the digital cassette 12, recharging the rechargeable battery.

Explanation will now be given of the operation of the radiographic image handling system 10 according to the first exemplary embodiment. When accommodating one size of digital cassette 12 from the plural sizes of digital cassette 12 in one of the insertion grooves 172 of the cassette stand 84, the casing 20 of the digital cassette 12 is inserted up to the position where the bottom face 20A of the casing 20 contacts the bottom face 172A of the insertion groove 172 of the cassette stand 84. The casing 20 of the digital cassette 12 is inserted up to the position where the side face of the casing 20 contacts the back face 172B of the insertion groove 172 of the cassette stand 84, due to the inclination of the bottom face 172A of the insertion groove 172 of the cassette stand 84. The individual rechargeable battery electrodes 76 and the individual electrodes 142 thereby make contacts and become in a conductive state, and the power output electrode 74 and the electrode 134 also make contact and enter an electrically conductive state.

The rechargeable battery of the main power source unit 80 is thereby recharged by the recharging unit 146 of the cassette stand 84, through the electrodes 142 and the rechargeable battery electrodes 76.

When image data read-out is instructed from the operation unit 116, the image data stored in the image memory 50 of the digital cassette 12 is read out and output to the output controller 72 by the read-out unit 108 of the cassette stand 84. The image data is then read out through the power output electrode 74 and the electrode 134 and stored as image data in the image memory 124 of the cassette stand 84.

As explained above, according to the radiographic image handling system of the first exemplary embodiment, the connected bottom and side faces of the accommodated digital cassette contact the bottom and back faces of the insertion groove of the cassette stand, making the electrical contacts formed on the back face and bottom face contact the rechargeable battery electrical contacts and the output electrical contact provided to the bottom face and side face of the digital cassette. Consequently the cassette stand is stably electrically connected to the digital cassette, and charging and read out of radiographic images can be performed.

However, even if a digital cassette with a different size is accommodated in the cassette stand, the connected bottom and side faces of the accommodated digital cassette contact the bottom face and back face of the insertion groove of the cassette stand. Since unique positional alignment can be achieved the cassette stand can be stably electrically connected to the digital cassette by the provision of each of the electrical contacts so as to make contact.

In the above exemplary embodiment explanation has been given of an example of a case where both recharging and radiographic image read-out are performed for the digital cassette, however there is no limitation thereto. One or other of recharging or radiographic image read-out may be performed for the digital cassette depending on the cassette stand. When only recharging is being performed then the rechargeable battery electrode may be provided to at least one of the connected bottom or side faces of the digital cassette, and an electrode connected to the recharging unit may be provided to at least one of the bottom or back faces of the insertion groove of the cassette stand. When only read-out of radiographic images is being performed then an output electrode may be provided to at least one of the connected bottom or side faces of the digital cassette, and an electrode connected to the read-out unit may be provided to at least one of the bottom face or back face of the insertion groove of the cassette stand.

Explanation has been given of an example in which the cassette stand is formed with plural insertion grooves, however there is no limitation thereto. The digital cassette may be accommodated in a sloping groove, partitioned into plural sections by partitioning members, so that digital cassettes can be accommodated in each of the respective sections of the groove. In such a case electrodes may be provided to the bottom and back faces of each of the partitioned sections of the groove.

In addition, although explanation has been given of an example in which the rechargeable battery electrode and the output electrode are provided at predetermined positions from the edge line, formed between the bottom face and the side face connected to the bottom face, there is no limitation thereto. The rechargeable battery electrode and the output electrode may be provided within the range of a predetermined region in which the bottom face of the casing of the smallest size of digital cassette makes contact with the face opposing the bottom face. In addition the rechargeable battery electrode and the output electrode may be provided within the range of a predetermined region in which the side face connected to the bottom face of the casing of the smallest size of digital cassette makes contact with the back face that opposes the side face connected to the bottom face. In such cases the electrodes should be provided on the bottom face and back face of the insertion groove so as to make contact with the rechargeable battery electrode and the output electrode whichever size of digital cassette is accommodated.

Explanation has been given of an example in which the output electrode and the rechargeable battery electrode are provided to the bottom face of the digital cassette and to the side face connected to the bottom face, however there is no limitation thereto. The rechargeable battery electrode and the output electrode may be provided to only one of the bottom face of the digital cassette or the side face connected to the bottom face. Explanation has been given of a case in which the rechargeable battery electrode and the output electrode are provided to the corner region at the edge line between the bottom face of the digital cassette and the side face connected to the bottom face, however there is no limitation thereto.

Explanation will now be given of a second exemplary embodiment. Similar parts of the configuration to those of the first exemplary embodiment are allocated the same reference numerals and explanation thereof is omitted.

The second exemplary embodiment differs from the first exemplary embodiment in that only the recharging electrodes are provided to the digital cassette and cassette stand respectively, and in that the cassette stand is one that can recharge digital cassettes both when accommodated upright and when accommodated laid down.

Figure 6:
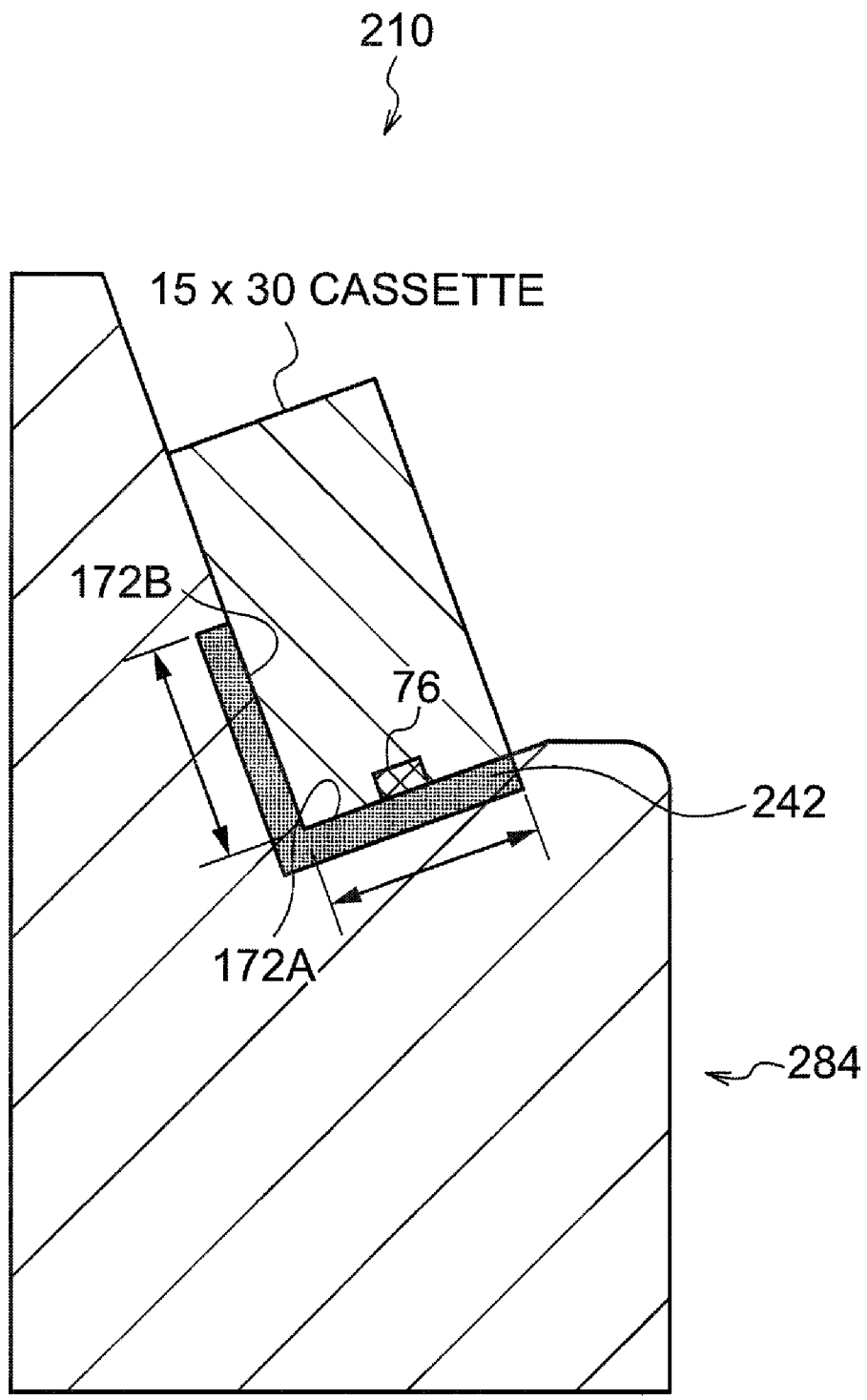
FIG. 6 is a cross-sectional view showing a schematic configuration of a digital cassette and a cassette stand according to a second exemplary embodiment of the present invention.
Figure 7:
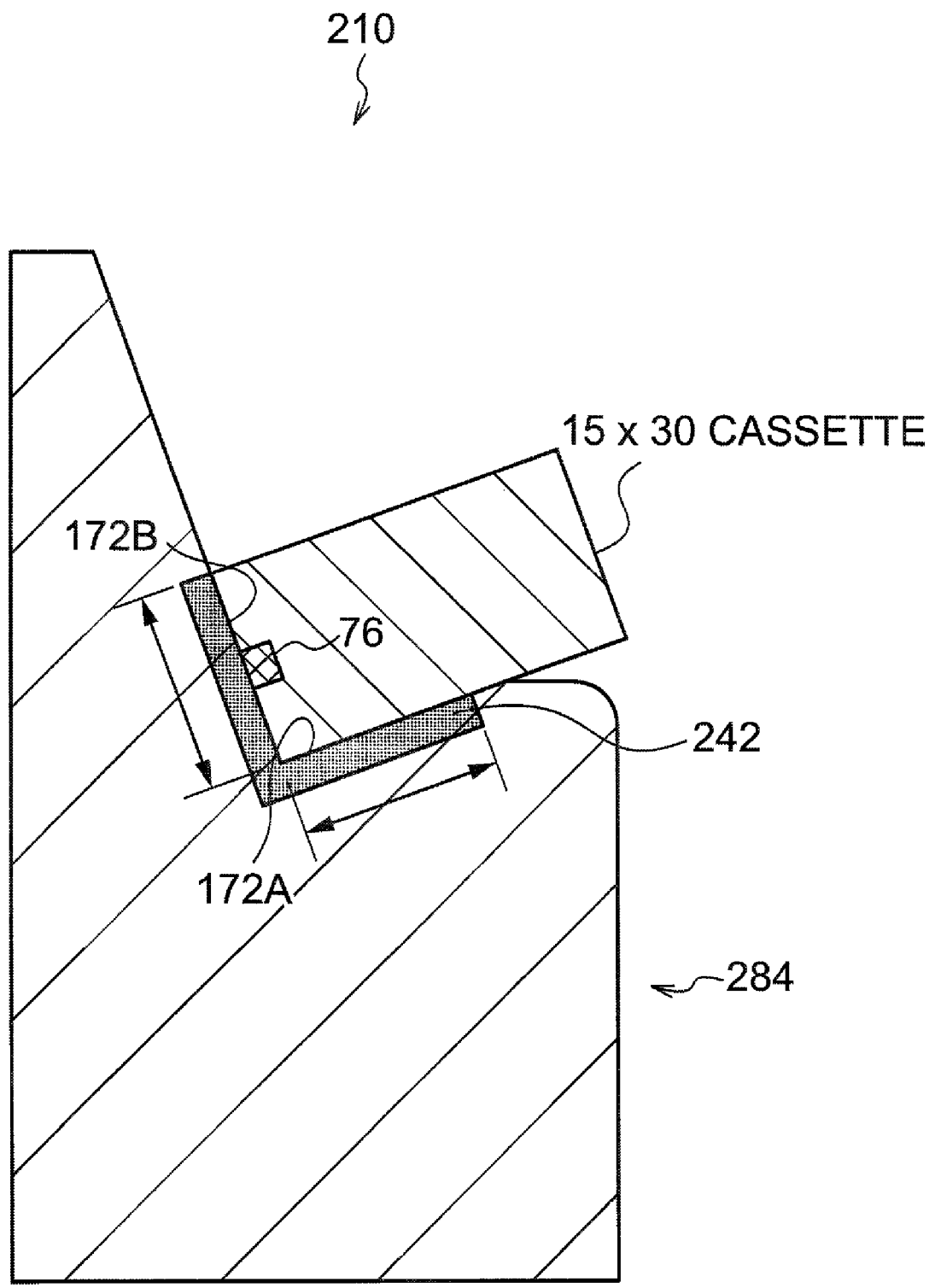
FIG. 7 is a cross-sectional view showing a schematic configuration of a digital cassette and a cassette stand according to the second exemplary embodiment of the present invention.

A digital cassette 212 of a radiographic image handling system 210 according to the second exemplary embodiment, as shown in FIG. 6, is provided with a rechargeable battery electrode 76 so as to be exposed from the bottom face 20A at a predetermined region within a predetermined range from the edge line, formed between the bottom face 20A of the casing 20 of the digital cassette 12 and the side face connected to the bottom face 20A.

In a cassette stand 284 of the radiographic image handling system 210 an electrode 242 is also provided to the bottom face 172A and the back face 172B of the casing 94, in a region with a range length in the length direction of the bottom face 20A of the smallest digital cassette 212.

The rechargeable battery electrode 76 and the electrode 242 make contact and enter a conductive state when the bottom face 20A of the casing 20 of the digital cassette 212 is in contact with the bottom face 172A of the insertion groove 172 and the side face adjacent to the bottom face 20A of the casing 20 of the digital cassette 212 is in contact with the back face 172B of the insertion groove 172.

The rechargeable battery electrode 76 and the electrode 242 also make contact and enter a conductive state when the bottom face 20A of the casing 20 of the digital cassette 212 is in contact with the back face 172B of the insertion groove 172 and the side face adjacent to the bottom face 20A of the casing 20 of the digital cassette 212 is in contact with the bottom face 172A of the insertion groove 172

The electrode 242 of the cassette stand 284 is connected to the recharging unit 146 through a conductor. The recharging unit 146 supplies power to the rechargeable battery of the main power source unit 80 of the digital cassette 212 when the electrode 242 and the rechargeable battery electrode 76 make contact and are in a conductive state, recharging the rechargeable battery.

Explanation will now be given of the operation of the radiographic image handling system 210 according to the second exemplary embodiment. When one size of the digital cassettes 212 from the plural sizes of digital cassette 212 is accommodated upright in one of the insertion grooves 172 of the cassette stand 284, the casing 20 of the digital cassette 212 is inserted up to a position where the bottom face 20A of the casing 20 makes contact with the bottom face 172A of the insertion groove 172 of the cassette stand 284, and the side face of the casing 20 makes contact with the back face 172B of the insertion groove 172 of the cassette stand 284. The rechargeable battery electrode 76 and the electrode 242 are thereby placed in contact and enter a conductive state.

The rechargeable battery of the main power source unit 80 is then recharged by the recharging unit 146 of the cassette stand 284, through the electrode 242 and the rechargeable battery electrode 76.

In addition, when one size of the digital cassettes 212 from the plural sizes of digital cassettes 212 is accommodated lying down in one of the insertion grooves 172 of the cassette stand 284, the casing 20 of the digital cassette 212 is inserted up to a position where the bottom face 20A of the casing 20 makes contact with the back face 172B of the insertion groove 172 of the cassette stand 284, and the side face of the casing 20 makes contact with the bottom face 172A of the insertion groove 172 of the cassette stand 284. The rechargeable battery electrode 76 and the electrode 242 are thereby placed in contact and enter a conductive state.

The main power source unit 80 is recharged, through the electrode 242 and the rechargeable battery electrode 76, by the recharging unit 146 of the cassette stand 284.

Recharging can be performed both when the digital cassette is accommodated upright and also when the digital cassette is accommodated laid down, by the connected bottom and side faces of the accommodated digital cassette making contact with the bottom face and the back face of the cassette stand, and the electrode formed to the back face and bottom face stably electrically connects the cassette stand to the digital cassette by making contact with the rechargeable battery electrode provided to the bottom face of the digital cassette, enabling recharging to be performed.

In the above exemplary embodiment an example has been explained in which the rechargeable battery electrode is provided to the bottom face of the digital cassette, however the output electrode may be provided to the bottom face of the digital cassette. In this case the electrode formed to the bottom face and back face of the cassette stand should be in contact with the read-out unit. Other alternative permissible configurations include the rechargeable battery electrode, or the output electrode, provided to the side face of the digital cassette connected to the bottom face.

Also, the rechargeable battery electrode and the output electrode may both be provided to the bottom face or to the side face connected to the bottom face of the digital cassette. In such cases the electrode formed to the bottom face and back face of the insertion groove may be connected through a changeover switch to both the recharging unit and to the read-out unit. When recharging is instructed by the operation unit the changeover switch is controlled so that the digital cassette is recharged by the recharging unit through the electrode and the rechargeable battery electrode, and when reading out of radiographic images is instructed by the operation unit, the changeover switch is controlled so that the radiographic images are read out by the read-out unit through the electrode and the output electrode.

Explanation will now be given of a third exemplary embodiment. Similar parts of the configuration to those of the first exemplary embodiment are allocated the same reference numerals and explanation thereof is omitted.

The third exemplary embodiment is different to the first exemplary embodiment in that a portion of the bottom face and back face of the insertion groove of the cassette stand is configured so as to be moveable.

Figure 8A:
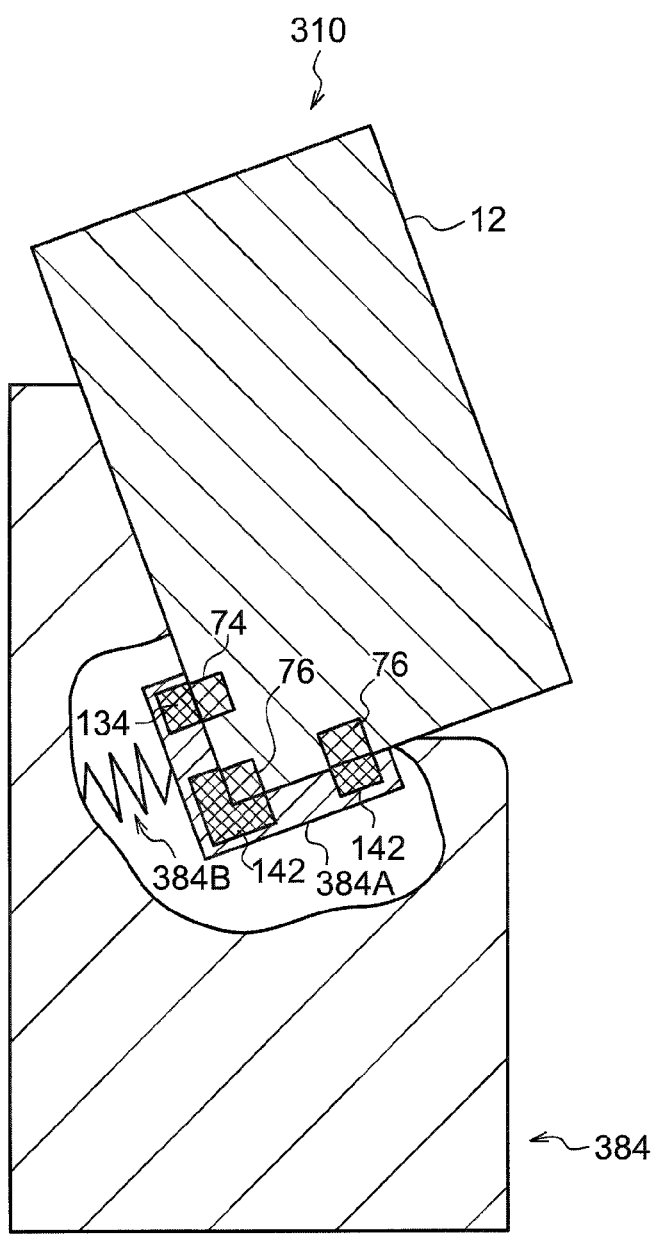
FIG. 8A is a cross-sectional view showing a schematic configuration of a digital cassette and a cassette stand according to a third exemplary embodiment of the present invention.

The cassette stand 384 of the radiographic image handling system 310 according to the third exemplary embodiment is, as shown in FIG. 8A, configured with a movable portion 384A provided to a portion of the bottom face 172A and a portion of the back face 172B, portions that include the edge line formed by the bottom face 172A and the back face 172B. The movable portion 384A is configured movable with respect to the cassette stand 384. A spring member 384B is provided to the cassette stand 384, the spring member 384B moving the movable portion 384A in a direction perpendicular to the back face 172B.

Figure 9:
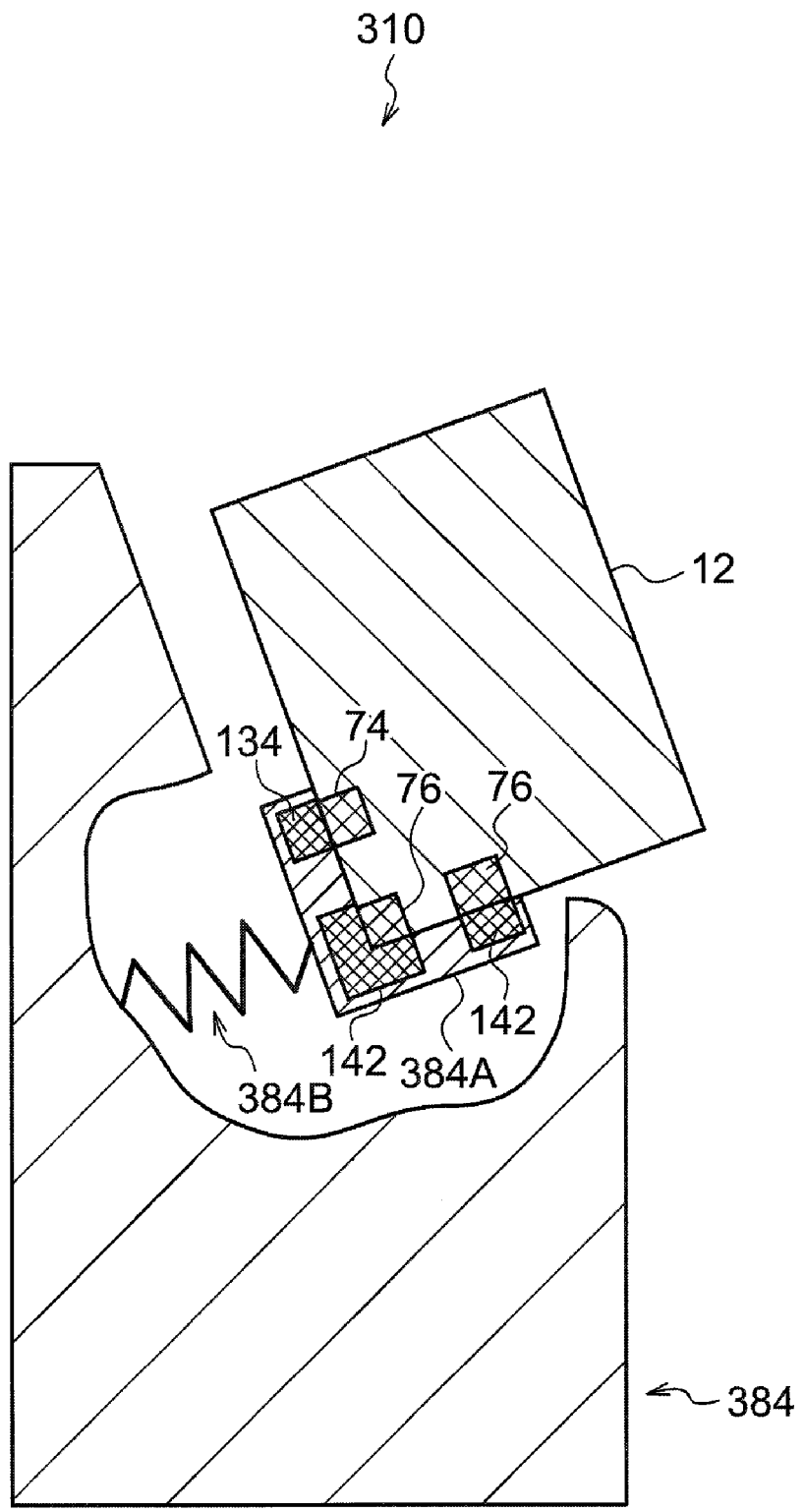
FIG. 9 is a cross-sectional view showing a condition in which the accommodation position of a digital cassette has been pushed out by a spring member.

The spring member 384B, as shown in FIG. 9, pushes up the accommodation position of the digital cassette 12, by moving the position of the movable portion 384A by a greater amount the smaller the weight of the accommodated digital cassette 12.

Figure 8B:
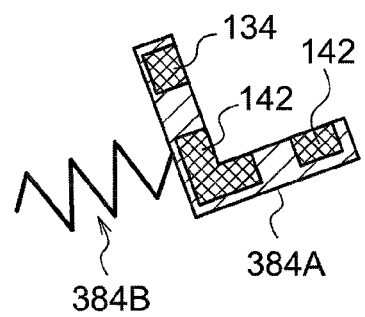
FIG. 8B is a cross-sectional view showing a configuration of a movable portion and a spring member.

The electrodes 134, 142 are provided so as to be exposed at regions of the movable portion 384A that make contact with the power output electrode 74 and the rechargeable battery electrode 76 in the state in which the casing 20 of the digital cassette 12 is inserted into the insertion groove 172, as shown in FIG. 8B.

Explanation will now be given of the operation of the radiographic image handling system 310 according to the third exemplary embodiment. When one size of the digital cassette 12 from the plural sizes of digital cassette 12 is accommodated upright in one of the insertion grooves 172 of the cassette stand 384, the casing 20 of the digital cassette 12 is inserted up to a position where the bottom face 20A of the casing 20 makes contact with the bottom face 172A of the insertion groove 172 of the cassette stand 384, and the side face of the casing 20 makes contact with the back face 172B of the insertion groove 172 of the cassette stand 384. When this is being performed the spring member 384B pushes up the accommodation position of the digital cassette 12, by moving the position of the movable portion 384A by an amount in accordance with the weight of the accommodated digital cassette 12.

The power output electrode 74 and the rechargeable battery electrode 76 on the digital cassette 12 side also make contact with the electrodes 134, 142 on the side of the movable portion 384A of the cassette stand 384, entering a conductive state.

The rechargeable battery of the main power source unit 80 is then recharged by the recharging unit 146 of the cassette stand 384 through the electrode 142 and the rechargeable battery electrode 76.

When reading out of the image data is instructed by the operation unit 116, the image data stored in the image memory 50 of the digital cassette 12 is output by the read-out unit 108 of the cassette stand 384, and image data is read out through the power output electrode 74 and the electrode 134.

As explained above, according to the radiographic image handling system of the third exemplary embodiment, small sizes of digital cassette can be prevented from becoming difficult to pull out when small sized digital cassettes are accommodated in a row between bigger sized accommodated digital cassettes. This is achieved by pushing up the accommodation position of the digital cassettes according to the weight of the digital cassette, such that the digital cassettes are pushed out from the cassette stand, and the pushed out position of each size of digital cassettes is aligned.

Explanation has been given in the above exemplary embodiment of an example in which the movable portion is pushed up by a spring member, however there is no limitation thereto, and the movable portion may be pushed up by a damper.

Explanation will now be given of a fourth exemplary embodiment. Similar parts of the configuration to those of the first exemplary embodiment and third exemplary embodiment are allocated the same reference numerals and explanation thereof is omitted.

The fourth exemplary embodiment differs from the third exemplary embodiment in that the accommodation position of the digital cassettes is pushed up according to the size of the accommodated digital cassette.

In the fourth exemplary embodiment, there is a sensor provided for detecting the size of the accommodated digital cassette 12, and there is a push-up mechanism provided for pushing up the position of the movable portion 384A in a direction orthogonal to the back face 172B. An actuator, for example, may be used for the push-up mechanism.

The accommodation position of the digital cassettes 12 is pushed up by the push-up mechanism so that the position of the movable portion 384A is higher in a direction orthogonal to the back face 172B the smaller the sensor-detected size of the digital cassette 12.

Other parts of the configuration and operation of the radiographic image handling system are similar to those of the third exemplary embodiment, and explanation thereof is omitted.

Explanation has been given in the above third exemplary embodiment and fourth exemplary embodiment of examples in which the movable portion is pushed up by the spring member and the push-up mechanism in a direction orthogonal to the back face of the insertion groove, however there is no limitation thereto. The spring member and the push-up mechanism may be provided so as to push out the movable portion in a direction orthogonal to the back face of the insertion groove.

Explanation will now be given of a fifth exemplary embodiment. Similar parts of the configuration to those of the first exemplary embodiment are allocated the same reference numerals and explanation thereof is omitted.

The fifth exemplary embodiment differs from the first exemplary embodiment in that the recharging unit and the read-out unit are provided externally to the cassette stand.

Figure 10:
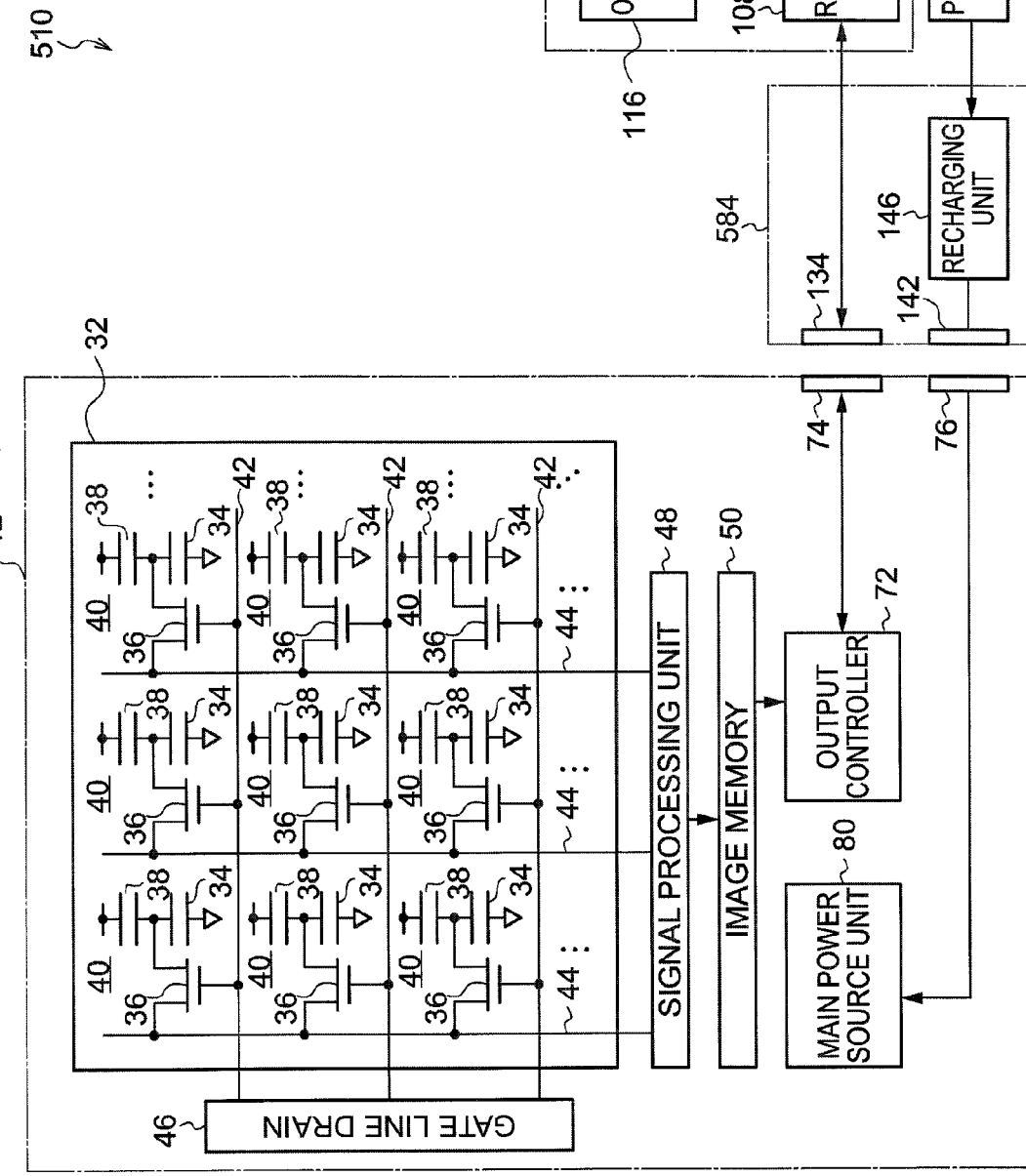
FIG. 10 is a block diagram showing a schematic configuration of a digital cassette, cassette stand, power source, and read-out device according to a fifth exemplary embodiment of the present invention.

The cassette stand 584 of the radiographic image handling system 510 according to the fifth exemplary embodiment is provided with the electrodes 134, 142 and the recharging unit 146, as shown in FIG. 10.

The recharging unit 146 is connected to a power source unit 544 configured by an AC adapter provided externally to the cassette stand 584. When the electrode 142 in the recharging unit 146 is in contact and in a conductive state with the rechargeable battery electrode 76, power that has been supplied from the power source unit 544 is supplied as power to the rechargeable battery of the main power source unit 80, recharging the rechargeable battery.

The electrode 134 of the cassette stand 584 is connected to a read-out unit 508 provided externally to the cassette stand 584. The read-out unit 508 is provided with the read-out unit 108, the operation unit 116, the image memory 124, and the output control unit 126.

The electrode 134 of the cassette stand 584 is connected through a conductor to the read-out unit 108 of the read-out unit 508. When the electrode 134 of the cassette stand 584 makes contact with the power output electrode 74 of the digital cassette 12 and is in an conductive state, the image data accumulated and stored in the image memory 50 of the digital cassette 12 is transferred to the read-out unit 108 of the read-out unit 508 through the power output electrode 74 and the electrode 134, and the image data is stored in the image memory 124 by the read-out unit 108.

Other parts of the configuration and the operation of the radiographic image handling system are similar to those of the first exemplary embodiment, and explanation thereof is omitted.

Explanation will now be given of a sixth exemplary embodiment. Similar parts of the configuration to those of the first exemplary embodiment are allocated the same reference numerals and explanation thereof is omitted.

The sixth exemplary embodiment differs from the first exemplary embodiment in that non-contact charging is performed.

Figure 11:
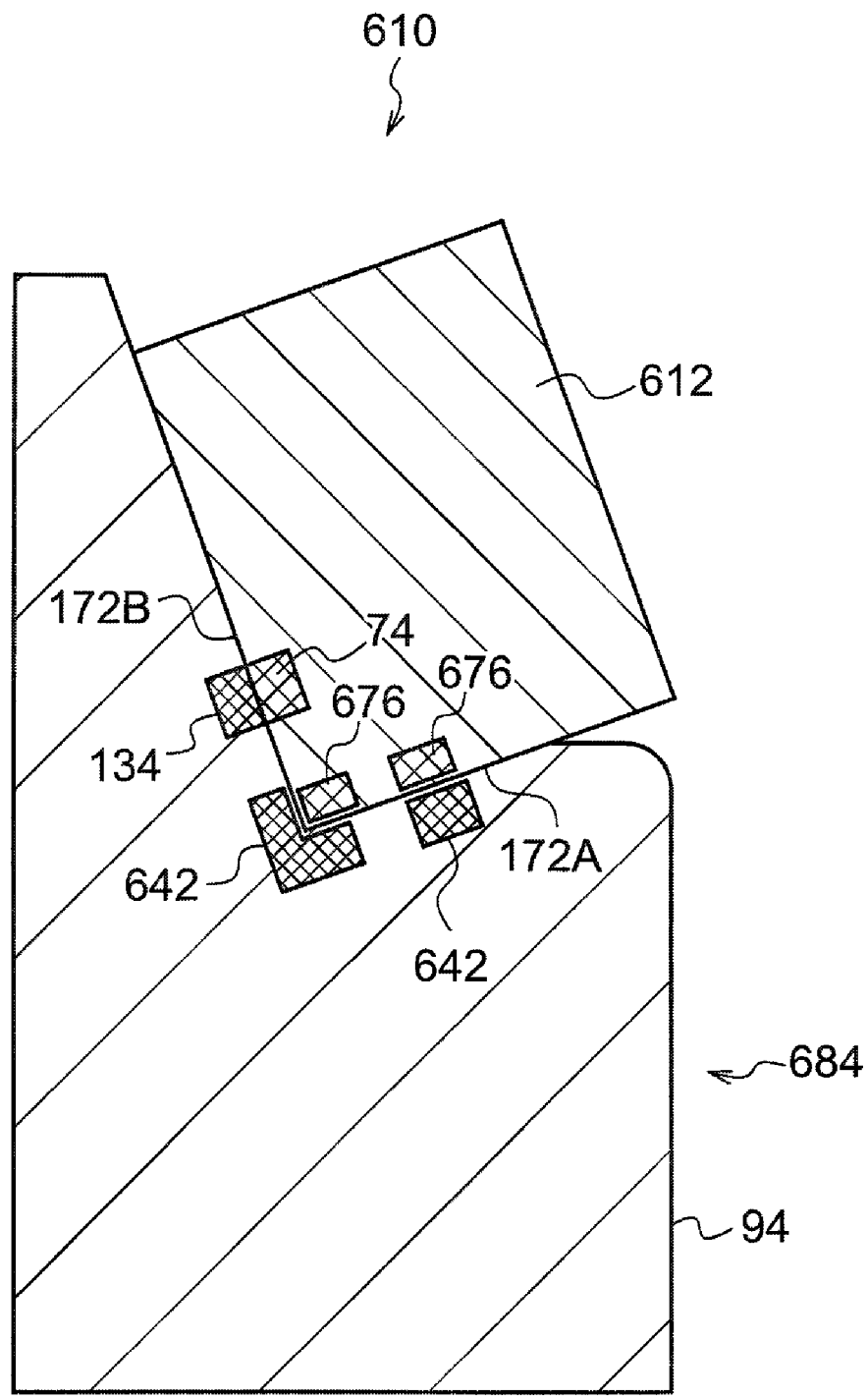
FIG. 11 is a cross-sectional view showing a schematic configuration of a digital cassette and a cassette stand according to a sixth exemplary embodiment of the present invention.

As shown in FIG. 11, a radiographic image handling system 610 according to the sixth exemplary embodiment is provided within the cassette stand 684 with power supply units 642, equipped with a primary coil for non-contact charging a battery of a digital cassette. The primary coils of the power supply units 642 are connected to a recharging unit 146.

Power receiving units 676 equipped with secondary coils are provided to the digital cassette 612. The secondary coils of the power receiving units 676 are connected to a main power source unit 80 through a charging circuit (not shown in the drawings) for rectifying induced power generated in the secondary coils.

The power receiving units 676 are provided at a corner region that includes the edge line formed between the bottom face 20A of the casing 20 of the digital cassette 612 and the side face connected to the bottom face 20A, and within a specific region of the bottom face 20A within a specific range from the edge line of the bottom face 20A.

The power supply units 642 are provided to regions of a bottom face 172A and a back face 172B of each insertion groove 172 of a casing 94 of the cassette stand 684, the regions facing the power receiving units 676 when the casing 20 of the digital cassette 612 is in the inserted state into the insertion groove 172.

When the casing 20 of the digital cassette 612 is inserted into the insertion groove 172 the power receiving units 676 on the digital cassette 612 side face the power supply units 642 of the cassette stand 684.

In this state a magnetic field is generated from the primary coils of the power supply unit 642 applied with an AC voltage, due to an electromagnetic induction effect. The power generated from the magnetic field by induction in the secondary coils of the power receiving units 676 is rectified by the charging circuit, and charges a rechargeable battery of the main power source unit 80.

Note that since other parts of the configuration and operation of the radiographic image handling system are similar to those of the first exemplary embodiment explanation thereof will be omitted.

Explanation will next be given of a seventh exemplary embodiment. Similar parts of the configuration to those of the first exemplary embodiment are allocated the same reference numerals and explanation thereof is omitted.

The seventh exemplary embodiment differs from the first exemplary embodiment in that a power source device, equipped with a secondary power source and electrodes for a rechargeable battery, is detachably accommodated within a digital cassette.

Figure 12:
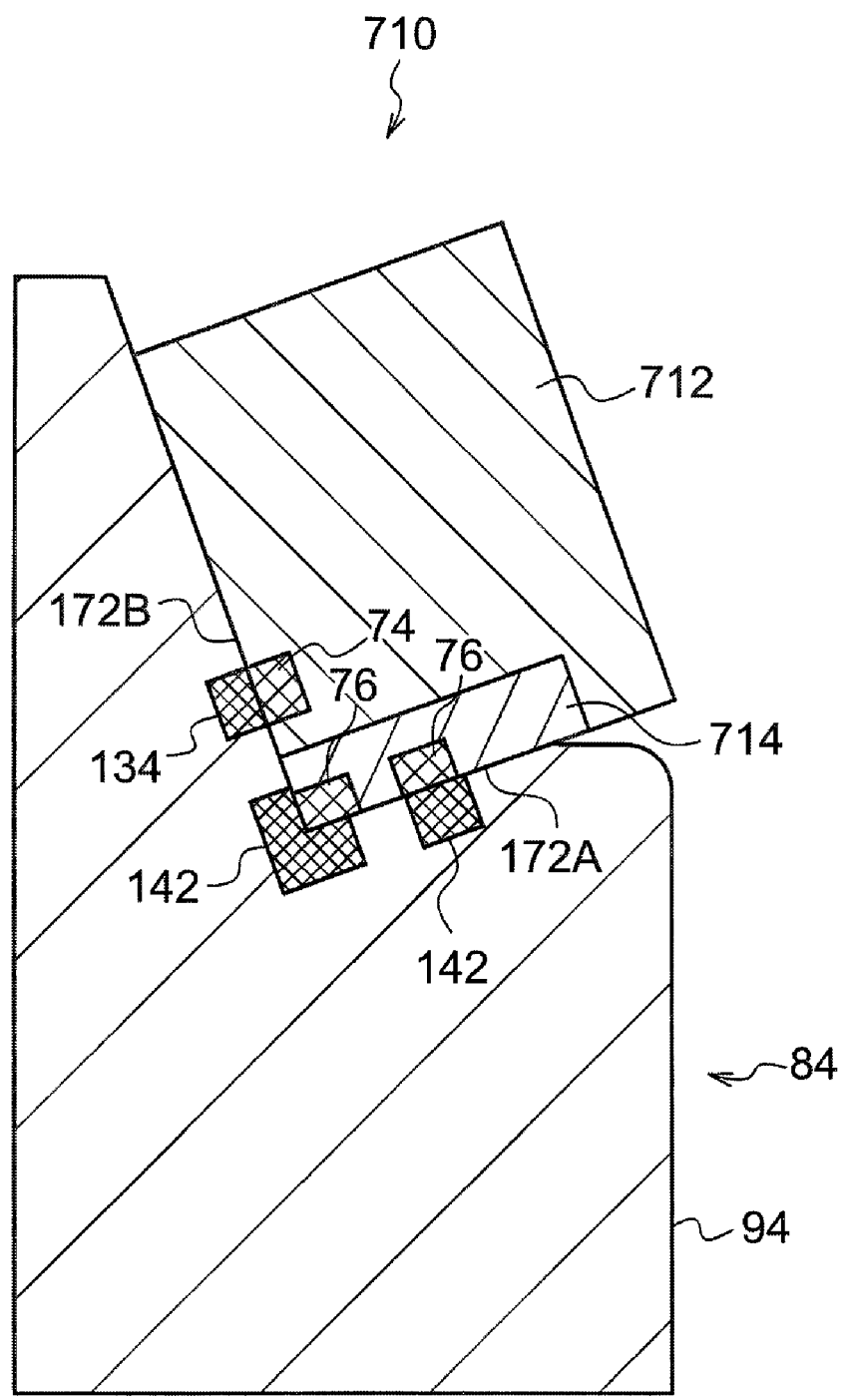
FIG. 12 is a cross-sectional view showing a schematic configuration of a digital cassette and a cassette stand according to a seventh exemplary embodiment of the present invention.

As shown in FIG. 12, a power source device 714 is detachably accommodated at bottom face side of the casing 20 of a digital cassette 712 of a radiographic image handling system 710 according to the seventh exemplary embodiment. The casing 20 of the digital cassette 712 is also configured such that a power source device 714, from plural sizes thereof, can be accommodated.

The power source device 714 is provided with a main power source unit 80 with rechargeable battery housed therein, and rechargeable battery electrodes 76.

The rechargeable battery electrodes 76 are provided at a corner region that includes the edge line formed between the bottom face of the casing of the power source device 714 and the side face connected to the bottom face thereof, and within a specific region of the bottom face within a specific range from the edge line of the bottom face.

Electrodes 142 are provided to a bottom face 172A and back face 172B of each insertion groove 172 in a casing 94 of a cassette stand 84, in regions thereof such that contact is made with the rechargeable battery electrodes 76 of the power source device 714 when the casing 20 of the digital cassette 712 is in the inserted state.

A power source device 714 of one size or another, from the power source devices 714 of plural sizes, is attached and housed in the side of the bottom face of the casing 20 of the digital cassette 712. When the casing 20 of the digital cassette 712, in which the power source device 714 is housed, is inserted into the insertion groove 172, the rechargeable battery electrodes 76 of the power source device 714 of the digital cassette 712 make contact with the electrodes 142 of the cassette stand 84 and enter an electrically conductive state.

Note that since other parts of the configuration and operation of the radiographic image handling system are similar to those of the first exemplary embodiment explanation thereof will be omitted.

In the above manner, even when a digital cassette attachable with power source devices of different sizes is accommodated in the cassette stand, the connected bottom face and side face of the power source device housed in the digital cassette make contact with the bottom face and back face of the insertion groove of the cassette stand. Since unique positioning can be made, the power source device of the digital cassette can be stably electrically connected to the cassette stand by provision of each of the electrodes so as to make contact.

Note that the above exemplary embodiment may be configured so as to perform non-contact charging in a similar manner to the above sixth exemplary embodiment.

Explanation will next be given of an eighth exemplary embodiment. Similar parts of the configuration to those of the first exemplary embodiment are allocated the same reference numerals and explanation thereof is omitted.

In the eighth exemplary embodiment explanation is given of a case in which the present invention is applied to a battery stand accommodating a power source device equipped with a rechargeable power source and rechargeable power source electrodes.

Figure 13:
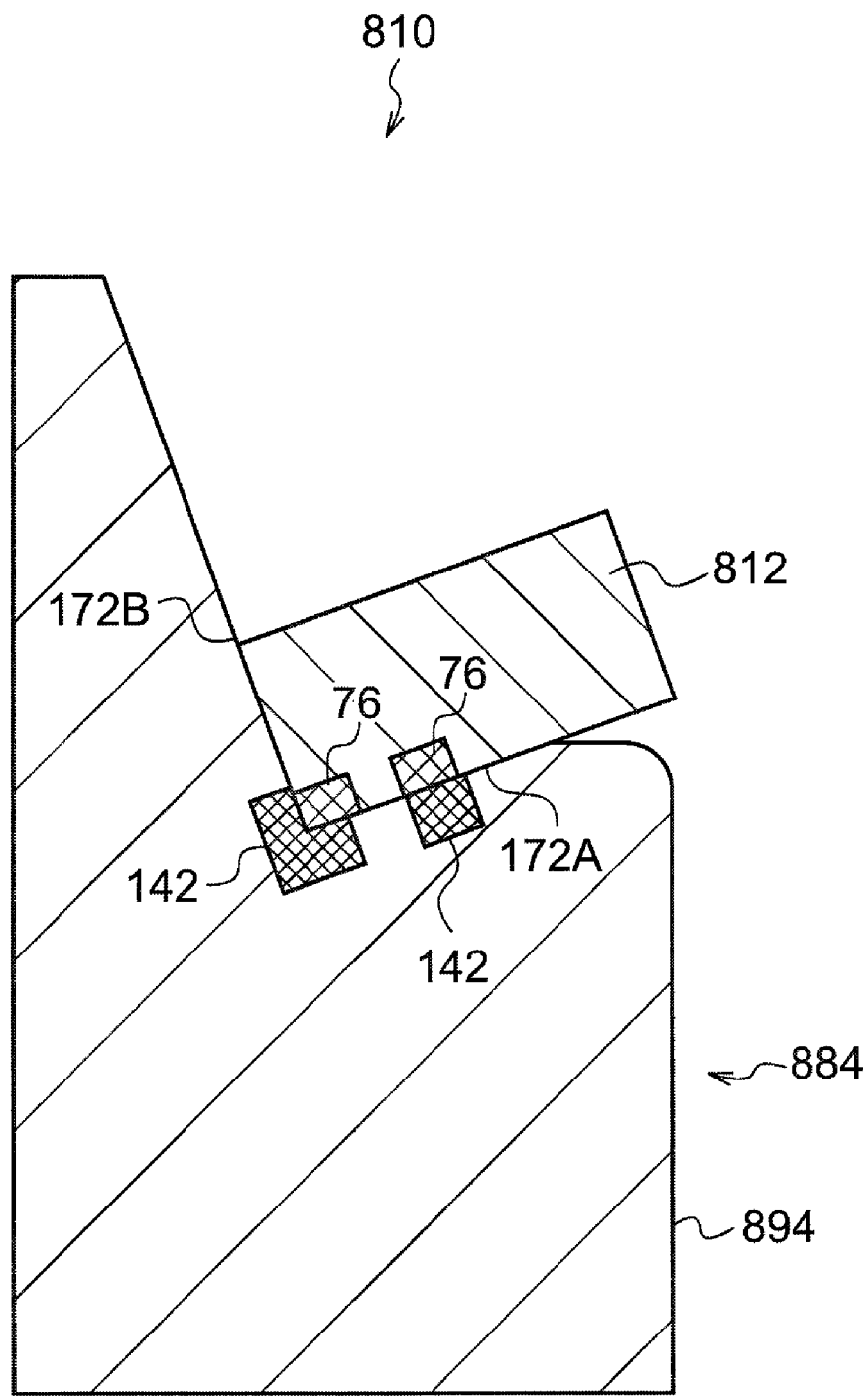
FIG. 13 is a cross-sectional view showing a schematic configuration of a power supply unit and battery stand according to an eight exemplary embodiment of the present invention.

As shown in FIG. 13, a power source device 812 of a recharging system 810 of the eighth exemplary embodiment is provided with a main power source unit 80 housing a rechargeable battery therein and with rechargeable battery electrodes 76.

Rechargeable battery electrodes 76 are provided at a corner region that includes the edge line formed between the bottom face of the casing of the power source device 812 and the side face connected to the bottom face thereof, and within a specific region of the bottom face within a specific range from the edge line of the bottom face.

Each insertion groove 172 in a casing 894 of a battery stand 884 is formed so as to be able to accommodate the power source devices 812 of plural different sizes.

Electrodes 142 are provided to a bottom face 172A and back face 172B of each insertion groove 172 in the casing 894 of the battery stand 884, in regions thereof such that contact is made with the rechargeable battery electrodes 76 of the power source device 814 when the casing of the digital cassette power source device 812 is in the inserted state.

When the casing of one or other size of the power source device 814 from the power source devices 814 of plural sizes is inserted into the insertion groove 172, the rechargeable battery electrodes 76 of the power source device 814 make contact with the electrodes 142 of the battery stand 884 and enter an electrically conductive state.

In the above manner, even when power source devices of different sizes are accommodated in the battery stand, the connected bottom face and side face of the power source device make contact with the bottom face and back face of the insertion groove of the battery stand. Since unique positioning can be made, the power source device can be stably electrically connected to the battery stand by provision of each of the electrodes so as to make contact.

Note that the above exemplary embodiment may be configured so as to perform non-contact charging in a similar manner to the above sixth exemplary embodiment.

Explanation will next be given regarding a ninth exemplary embodiment. Similar parts of the configuration to those of the first exemplary embodiment are allocated the same reference numerals and explanation thereof is omitted.

The ninth exemplary embodiment differs from the first exemplary embodiment in the point that a casing, into which a digital cassette has been detachably inserted, is accommodated in a cassette stand.

Figure 14:
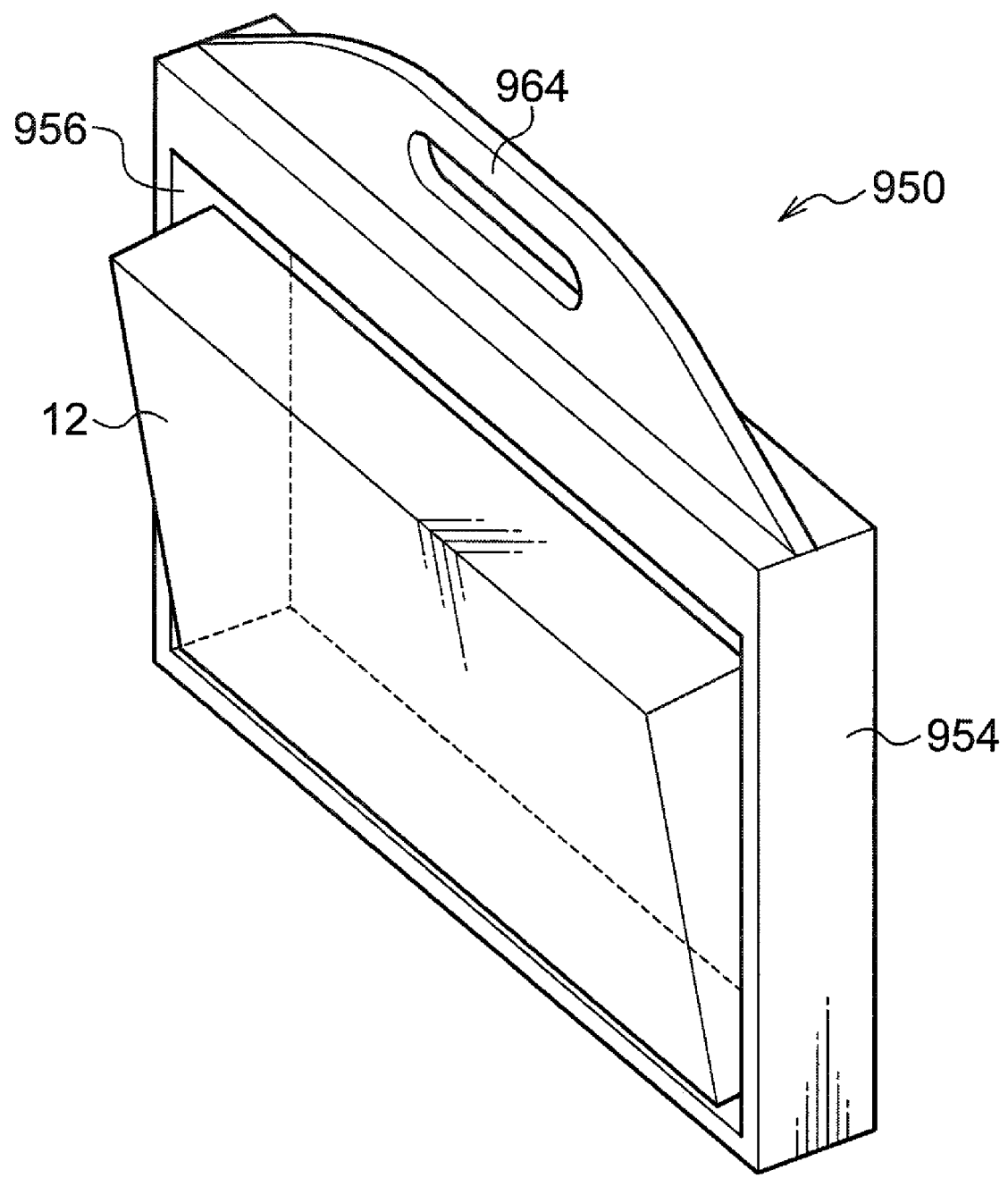
FIG. 14 is a perspective view showing a configuration of a casing into which a digital cassette has been inserted according to a ninth exemplary embodiment of the present invention.

As shown in FIG. 14, a digital cassette 12 of a radiographic image handling system 910 according to the ninth exemplary embodiment is detachably inserted into a casing 950.

The casing 950 has a rectangular shaped main body 954, and the main body 954 has an opening 956, making a large opening in one of the side faces of the main body 954. A grip portion 964 is provided at an upper portion of the main body 954. Projections (not shown in the figures) are formed in the bottom face and top face of the main body 954 forming the opening 956, and holes (not shown in the figures) are formed in that digital cassette 12 at a top face portion and a bottom face portion thereof. The digital cassette 12 is thereby fitted into the opening 956.

Plural sizes of the casing 950 are prepared, corresponding to the plural sizes of the digital cassette 12.

Figure 15:
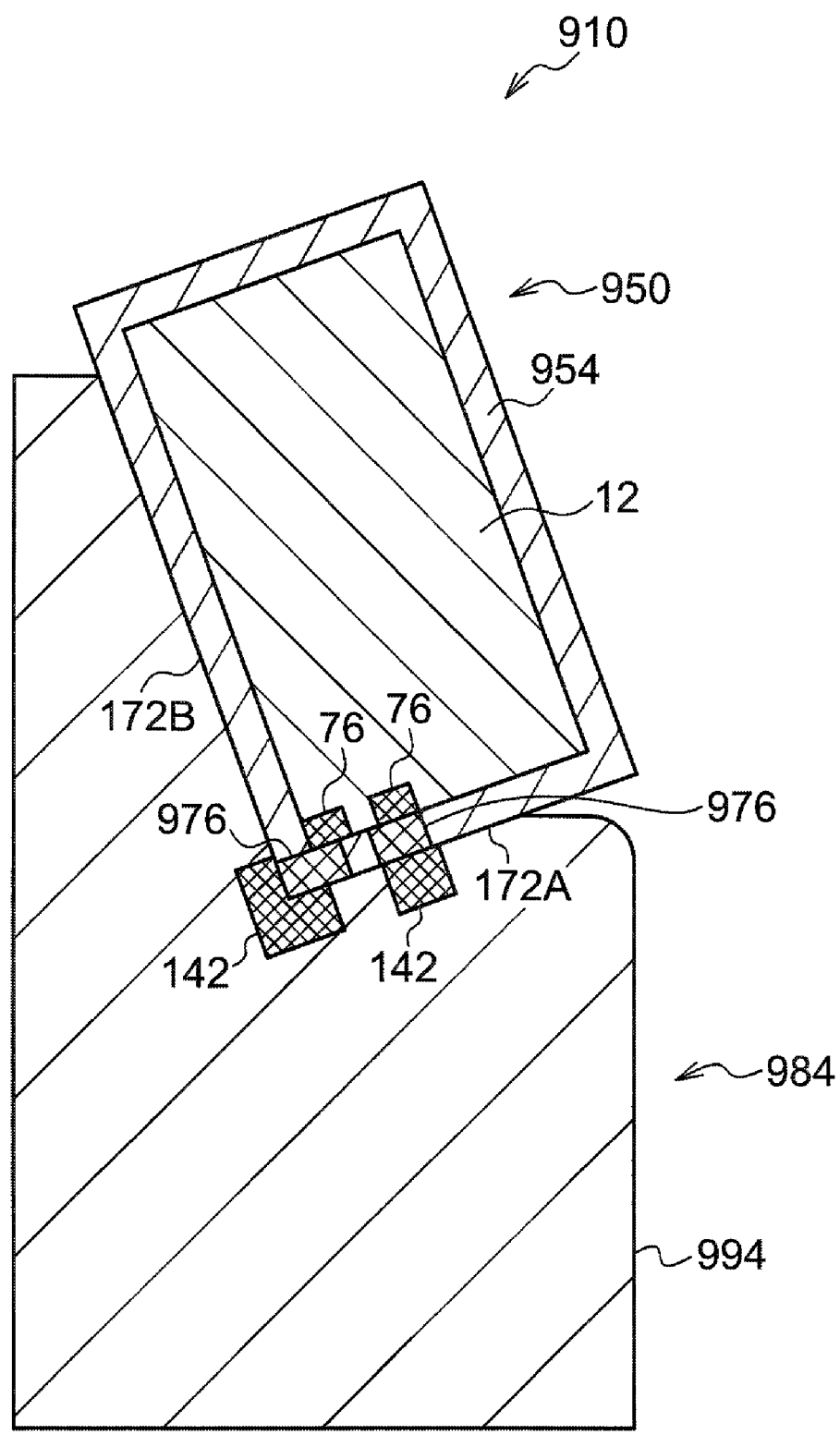
FIG. 15 is a cross-section showing a schematic configuration according to the ninth exemplary embodiment of the present invention of a digital cassette and cassette stand.

As shown in FIG. 15, rechargeable battery electrodes 976 are provided at a corner region that includes the edge line formed between the bottom face of the main body 954 of the casing 950 and the side face connected to the bottom face thereof, and within a specific region of the bottom face within a specific range from the edge line of the bottom face.

In a state in which the digital cassette 12 is inserted into the casing 950, the rechargeable battery electrodes 976 of the casing 950 make contact with rechargeable battery electrodes 76 provided to the digital cassette 12.

Electrodes 142 are provided to a bottom face 172A and back face 172B of each insertion groove 172 of a casing 994 of a cassette stand 984, in regions thereof such that contact is made with the rechargeable battery electrodes 976 of the casing 950 when the casing 950 is in an inserted state in the insertion groove 172.

The digital cassette 12 of one or other size, from the digital cassettes 12 of plural sizes, is inserted into the corresponding sized casing 950. When the casing 950, into which the digital cassette 12 has been inserted, is itself inserted into the insertion groove 172, the rechargeable battery electrodes 976 of the casing 950 and the electrodes 142 of the cassette stand 984 make contact, and enter an electrically conductive state. The rechargeable battery electrodes 76 of the digital cassette 12 and the electrodes 142 of the cassette stand 984 enter an electrically conductive state through the rechargeable battery electrodes 976 of the casing 950.

Note that since other parts of configuration and operation of the radiographic image handling system are similar to those of the first exemplary embodiment, further explanation thereof is omitted.

In this manner, even though casings of different sizes, into each of which a digital cassette has been detachably inserted, are accommodated in a cassette stand, since the connected bottom face and side face of the casing, into which the digital cassette has been inserted, is caused to make contact with the side face and back face of the insertion groove of the cassette stand and unique positioning can be made, the casing and cassette stand can be made to achieve stabile electrical contact by providing each of the electrodes so as to make contact.

Note that in the above exemplary embodiment, configuration may be made to perform non-contact charging in a similar manner to in the above sixth exemplary embodiment.

Explanation will next be given regarding a tenth exemplary embodiment. Similar parts of the configuration to those of the first exemplary embodiment and the ninth exemplary embodiment are allocated the same reference numerals and explanation thereof is omitted.

The tenth exemplary embodiment differs from the ninth exemplary embodiment in the point that a casing, into which a digital cassette has been detachably inserted, is installed with a rechargeable battery.

Figure 16:
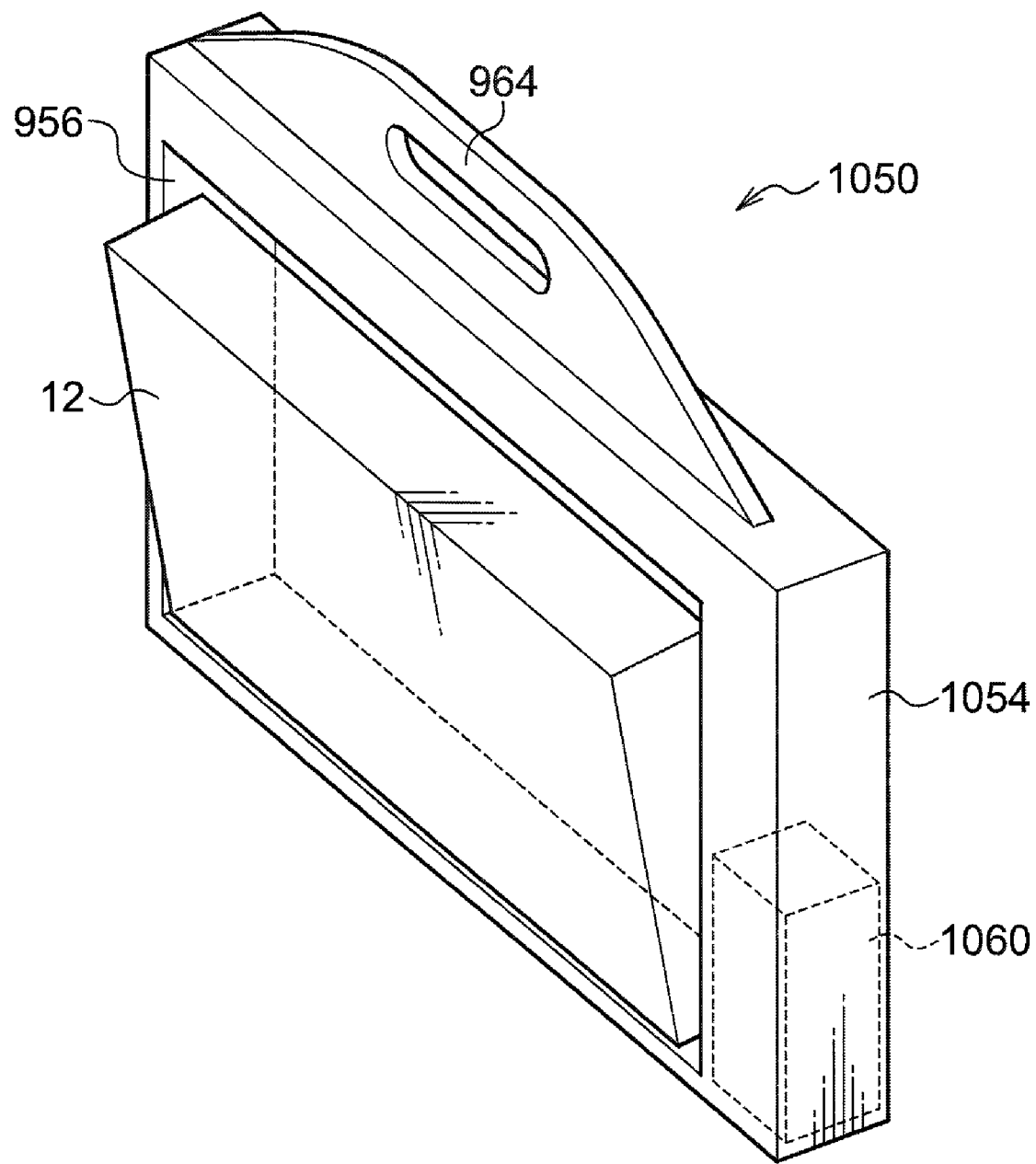
FIG. 16 is a perspective view showing a configuration of a casing into which a digital cassette has been inserted according to a tenth exemplary embodiment of the present invention.

As shown in FIG. 16, a digital cassette 12 of a radiographic image handling system 1010 according to the tenth exemplary embodiment is detachably inserted into a casing 1050.

A main body 1054 of the casing 1050 is installed with a rechargeable battery 1060 at a side of a side face of the main body 1054.

Figure 17:
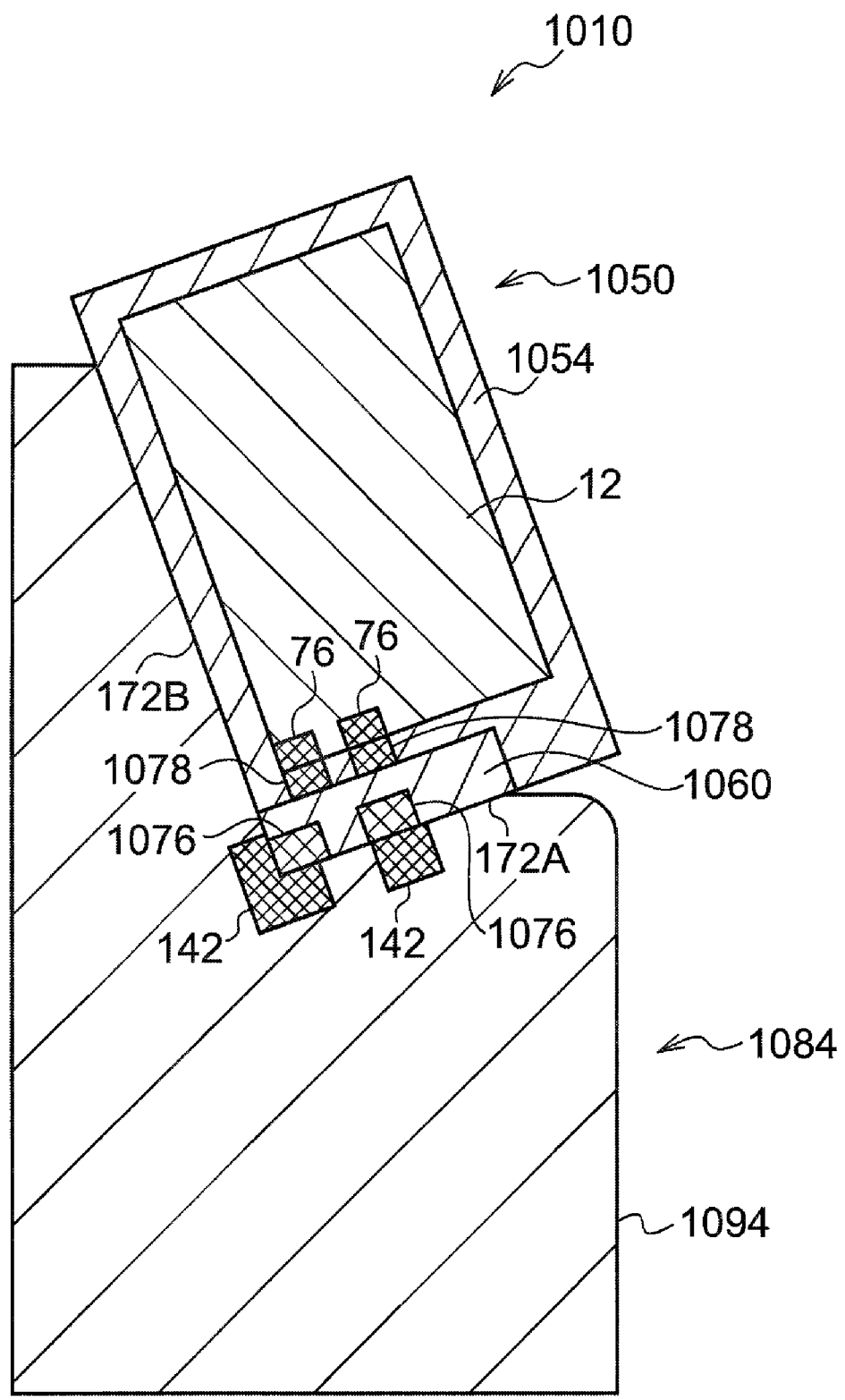
FIG. 17 is a cross-section showing a schematic configuration of a digital cassette and cassette stand according to the tenth exemplary embodiment of the present invention.

As shown in FIG. 17, rechargeable battery electrodes 1076 are provided at a corner region that includes the edge line formed between the bottom face of the main body 1054 of the casing 1050 and the side face connected to the bottom face thereof, and within a specific region of the bottom face within a specific range from the edge line of the bottom face.

In a state in which the digital cassette 12 is inserted into the casing 1050, the rechargeable battery 1060 installed in the casing 1050 makes contact with the rechargeable battery electrodes 76 provided to the digital cassette 12 through contact electrodes 1078 provided at the side of an opening 956 in the main body 1054. When this occurs, the rechargeable power source of a main power source unit 80 of the digital cassette 12 is charged with electrical power supplied from the rechargeable battery 1060.

Electrodes 142 are provided to a bottom face 172A and back face 172B of each insertion groove 172 of a casing 1094 of a cassette stand 1084, in regions thereof such that contact is made with the rechargeable battery electrodes 1076 of the casing 1050 when the casing 1050 is in an inserted state in the insertion groove 172.

The digital cassette 12 of one or other size, from the plural sizes of digital cassette 12, is inserted into the corresponding sized casing 1050. When the casing 1050, into which the digital cassette 12 has been inserted, is itself inserted into the insertion groove 172, the rechargeable battery electrodes 1076 of the casing 1050 and the electrodes 142 of the cassette stand 1084 make contact, and enter an electrically conductive state.

Note that since other parts of configuration and operation of the radiographic image handling system are similar to those of the first exemplary embodiment, further explanation thereof is omitted.

In this manner, even though casings of different sizes, installed with a rechargeable battery, are accommodated in a cassette stand, since the connected bottom face and side face of the casing, into which the digital cassette has been inserted, is caused to make contact with the side face and back face of the insertion groove of the cassette stand and unique positioning can be made, the casing and cassette stand can be made to achieve stabile electrical contact by providing each of the electrodes so as to make contact.

Note that in the above exemplary embodiment, configuration may be made to perform non-contact charging in a similar manner to in the above sixth exemplary embodiment.

It is also possible to accommodated the casing 1050 in the cassette stand 1084 in a state in which the digital cassette has not been inserted into the casing 1050.

The invention claimed is:

1. A cassette accommodating device configured to be capable of accommodating casings of a plurality of sizes, each casing detachably inserted with a cassette installed with a rechargeable battery and a radiation detection unit that is supplied with power from the rechargeable battery and generates a radiographic image according to an amount of received radiation, and each casing provided on at least one of two connected side faces with a power receiving unit that receives power for charging the rechargeable battery, the device comprising:
   a groove portion, formed with a sloping face that faces one of the two side faces of an accommodated casing, and a bottom face that faces the other of the two side faces of the accommodated casing, the bottom face being inclined such that the casing moves toward the sloping face when the casing is accommodated,
   wherein a power supply unit is formed to the sloping face, the bottom face, or any combination thereof, so as to supply power to the power receiving unit when the casing has been accommodated.

2. The cassette accommodating device according to claim 1, wherein the power receiving unit is provided to the casing on at least one of the two connected side faces within a range making contact with the sloping face or the bottom face when the casing has been accommodated.

3. The cassette accommodating device according to claim 1, wherein the power receiving unit is provided to the casing on at least one of the two connected side faces within a specific range from the edge line formed between the two side faces.

4. The cassette accommodating device according to claim 1 further comprising a recharging unit for recharging the rechargeable battery through the power receiving unit and the power supply unit when the casing has been accommodated.

5. The cassette accommodating device according to claim 1, wherein the power receiving unit is provided at a cassette on at least one of the two connected side faces within a predetermined range from an edge line formed between the two connected side faces.

6. The cassette accommodating device according to claim 1, wherein:
   the power supply unit is a primary coil for non-contact charging; and
   the power receiving unit is a secondary coil.

7. The cassette accommodating device according to claim 1, wherein a plurality of the groove portions is formed, and the power supply unit or the electrode is formed at the sloping face, the bottom face, or any combination thereof, of each of the groove portions.

8. The cassette accommodating device according to claim 1, wherein a plurality of the groove portions is formed, and the power supply unit or the electrodes is formed at the sloping face, the bottom face, or any combination thereof, of each of the groove portions.

9. A radiation detection system comprising the cassette accommodating device according to claim 1 and the casings of the plurality of sizes.

10. A cassette accommodating device configured to be capable of accommodating casings of a plurality of sizes, each casing detachably inserted with a cassette installed with a first rechargeable battery and a radiation detection unit that is supplied with power from the first rechargeable battery and generates a radiographic image according to an amount of received radiation, each casing provided with a second rechargeable battery for supplying power to charge the first rechargeable battery, and each casing provided on at least one of two connected side faces with a power receiving unit that receives power for charging the second rechargeable battery, the device comprising:
   a groove portion, formed with a sloping face that faces one of the two side faces of an accommodated casing, and a bottom face that faces the other of the two side faces of the accommodated casing, the bottom face being inclined such that the casing moves toward the sloping face when the casing is accommodated,
   wherein a power supply unit is formed to the sloping face, the bottom face, or any combination thereof, so as to supply power to the power receiving unit when the casing has been accommodated.

11. The cassette accommodating device according to claim 10, wherein the power receiving unit is provided to the casing on at least one of the two connected side faces within a range making contact with the sloping face or the bottom face when the casing has been accommodated.

12. The cassette accommodating device according to claim 10, wherein the power receiving unit is provided to the casing on at least one of the two connected side faces within a specific range from the edge line formed between the two side faces.

13. The cassette accommodating device according to claim 10 further comprising a recharging unit for recharging the second rechargeable battery through the power receiving unit and the power supply unit when the casing has been accommodated.

14. The cassette accommodating device according to claim 10, wherein the power receiving unit is provided at a cassette on at least one of the two connected side faces within a predetermined range from an edge line formed between the two connected side faces.

15. The cassette accommodating device according to claim 10, wherein:
the power supply unit is a primary coil for non-contact charging; and
the power receiving unit is a secondary coil.

16. The cassette accommodating device according to claim 10, wherein a plurality of the groove portions is formed, and the power supply unit or the electrode is formed at the sloping face, the bottom face, or any combination thereof, of each of the groove portions.

17. The cassette accommodating device according to claim 10, wherein a plurality of the groove portions is formed, and the power supply unit or the electrodes is formed at the sloping face, the bottom face, or any combination thereof, of each of the groove portions.

18. A radiation detection system comprising the cassette accommodating device according to claim 10 and the casings of the plurality of sizes.

* * * * *